(12) United States Patent
Moon et al.

(10) Patent No.: US 12,416,947 B2
(45) Date of Patent: Sep. 16, 2025

(54) ELECTRONIC DEVICE COMPRISING HOUSING ASSEMBLY STRUCTURE

(71) Applicant: SAMSUNG ELECTRONICS CO., LTD., Suwon-si (KR)

(72) Inventors: Heecheul Moon, Suwon-si (KR); Gyeongtae Kim, Suwon-si (KR); Moohyun Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 18/227,682

(22) Filed: Jul. 28, 2023

(65) Prior Publication Data

US 2023/0367371 A1 Nov. 16, 2023

Related U.S. Application Data

(63) Continuation of application No. PCT/KR2021/019951, filed on Dec. 27, 2021.

(30) Foreign Application Priority Data

Jan. 29, 2021 (KR) .................. 10-2021-0012843
May 20, 2021 (KR) .................. 10-2021-0064553

(51) Int. Cl.
*G06F 1/16* (2006.01)
*H04M 1/02* (2006.01)

(52) U.S. Cl.
CPC ........ *G06F 1/1656* (2013.01); *H04M 1/0266* (2013.01)

(58) Field of Classification Search
CPC . G06F 1/1656; H04M 1/0266; H04M 1/0249; H04M 1/0283; H04M 1/18; H01Q 1/243
See application file for complete search history.

(56) References Cited

U.S. PATENT DOCUMENTS 10,505,254 B2 * 12/2019 Mazooji ........... G06K 19/07783
10,691,168 B2    6/2020 Huang
(Continued)

FOREIGN PATENT DOCUMENTS

CN        112532263 A       3/2021
JP        2019-106690 A     6/2019
(Continued)

OTHER PUBLICATIONS

Communication issued on May 27, 2024 by the European Patent Office for European Patent Application No. 21923457.2.
(Continued)

*Primary Examiner* — Imani N Hayman
*Assistant Examiner* — Hung Q Dang
(74) *Attorney, Agent, or Firm* — Sughrue Mion, PLLC

(57) ABSTRACT

An electronic device is provided. The electronic device includes: a first plate; a second plate; a lateral member provided around a space between the first plate and the second plate, the lateral member including a conductive part and a nonconductive part; a frame member provided at least partly along a border of the lateral member and at least partially forming a side surface of the electronic device; and a display in the space and facing the first plate. The frame member is coupled with the nonconductive part.

18 Claims, 18 Drawing Sheets

(56) References Cited

U.S. PATENT DOCUMENTS

| | | |
|---|---|---|
| 10,821,638 B2 | 11/2020 | Huang et al. |
| 2015/0155614 A1 | 6/2015 | Youn et al. |
| 2015/0163940 A1 | 6/2015 | Scott et al. |
| 2015/0245513 A1 | 8/2015 | Moon |
| 2016/0044801 A1 | 2/2016 | Lee et al. |
| 2017/0133748 A1 | 5/2017 | Kim et al. |
| 2018/0070465 A1 | 3/2018 | Cater et al. |
| 2019/0222683 A1 | 7/2019 | Choi et al. |
| 2019/0230203 A1 | 7/2019 | Huang et al. |
| 2020/0186183 A1 | 6/2020 | Park et al. |
| 2020/0252492 A1 | 8/2020 | Choi et al. |
| 2020/0358890 A1 | 11/2020 | Im et al. |
| 2020/0383216 A1 | 12/2020 | Ichiki |
| 2021/0037126 A1 | 2/2021 | Yoo et al. |
| 2021/0204435 A1 | 7/2021 | Choi et al. |

FOREIGN PATENT DOCUMENTS

| | | |
|---|---|---|
| KR | 10-2014-0061097 A | 5/2014 |
| KR | 10-1390973 B1 | 5/2014 |
| KR | 10-2016-0019248 A | 2/2016 |
| KR | 10-2017-0053401 A | 5/2017 |
| KR | 10-2019-0054384 A | 5/2019 |
| KR | 10-2019-0087140 A | 7/2019 |
| KR | 10-2019-0097553 A | 8/2019 |
| KR | 10-2094754 B1 | 3/2020 |
| KR | 10-2020-0094950 A | 8/2020 |
| KR | 10-2163406 B1 | 10/2020 |
| KR | 10-2020-0130020 A | 11/2020 |
| WO | 2015/037773 A1 | 3/2015 |

OTHER PUBLICATIONS

International Search Report (PCT/ISA/210) issued Apr. 7, 2022 from the International Searching Authority in International Application No. PCT/KR2021/019951.

Written Opinion (PCT/ISA/237) issued Apr. 7, 2022 from the International Searching Authority in International Application No. PCT/KR2021/019951.

Communication dated Apr. 30, 2025, issued by the Korean Intellectual Property Office in Korean Application No. 10-2021-0064553.

* cited by examiner

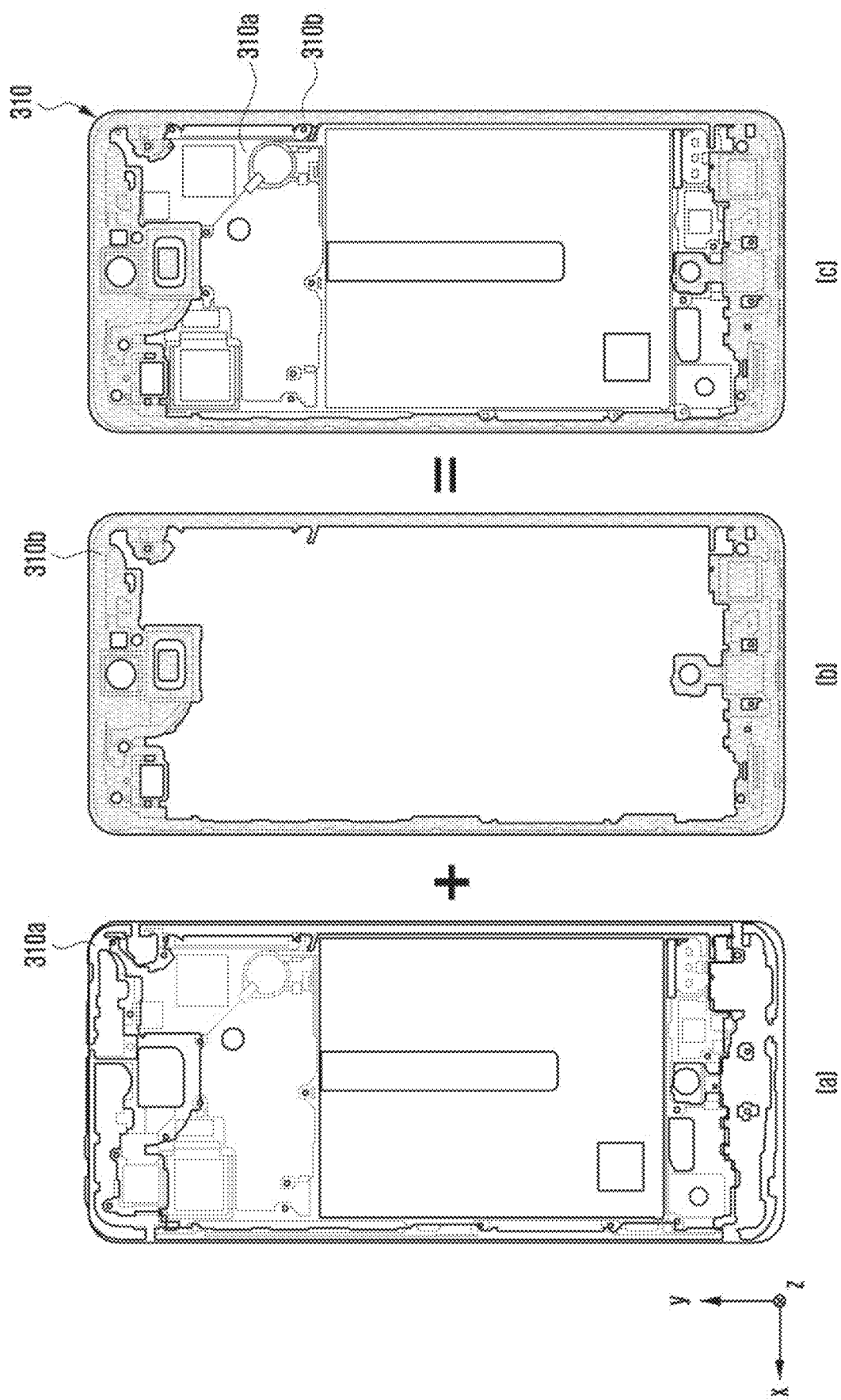

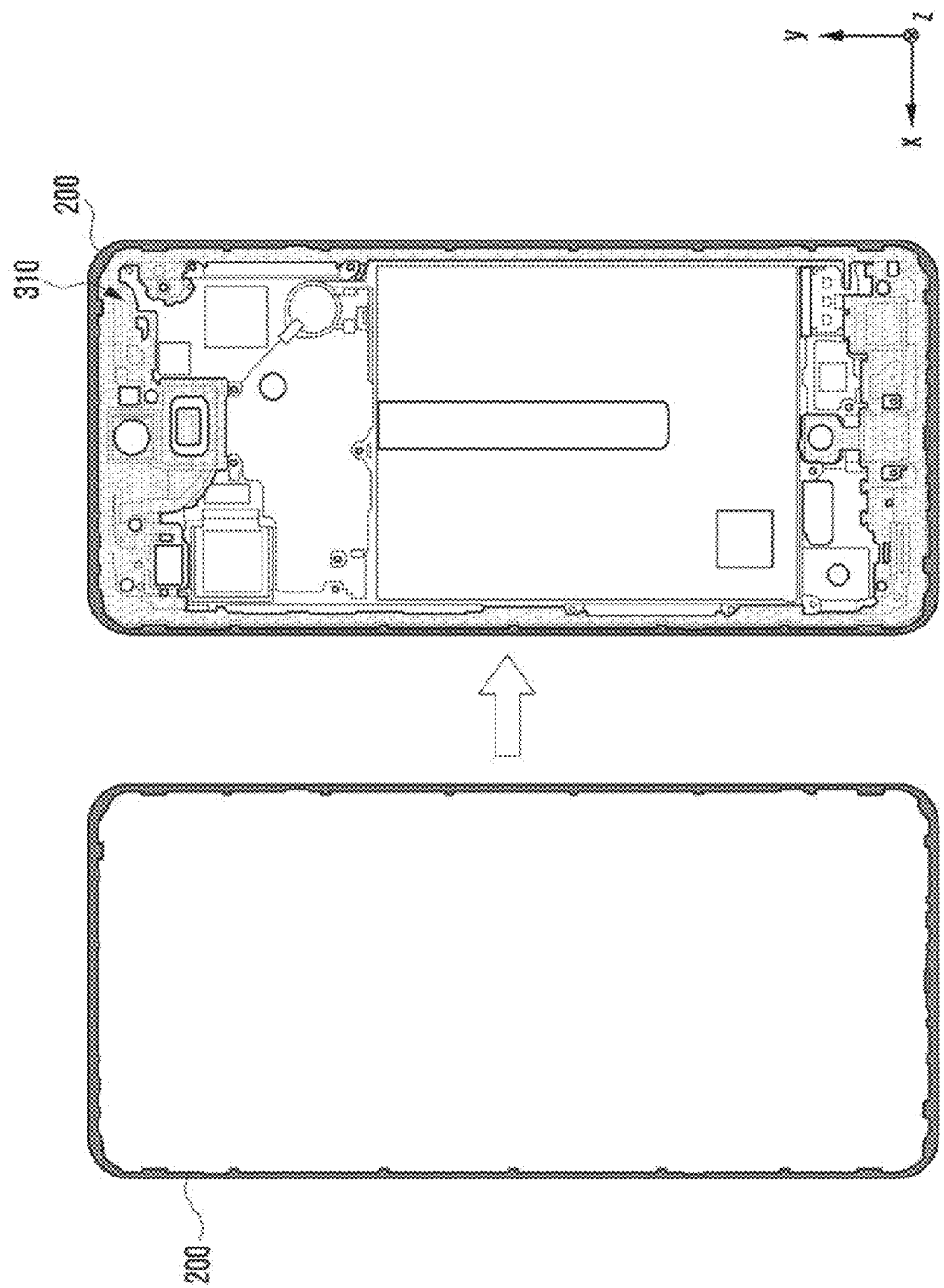

ELECTRONIC DEVICE COMPRISING HOUSING ASSEMBLY STRUCTURE

CROSS-REFERENCE TO RELATED APPLICATION(S)

This application is a bypass continuation application of International Application No. PCT/KR2021/019951, filed on Dec. 27, 2021, which is based on and claims priority to Korean Patent Application No. 10-2021-0012843, filed on Jan. 29, 2021, in the Korean Intellectual Property Office, and Korean Patent Application No. 10-2021-0064553, filed on May 20, 2021, in the Korean Intellectual Property Office, the disclosures of which are incorporated by reference herein in their entireties.

BACKGROUND

1. Field

The disclosure relates to an electronic device including a housing assembly structure.

2. Description of Related Art

An electronic device has gradually become miniaturized and slimmer, whereas its function has gradually become diverse. With the miniaturization and slimming of the electronic device, a metal material (e.g., conductive part or metal material) may be used for the purpose of rigidity reinforcement, beautiful appearance and/or designated function performance (e.g., antenna function). Because such usage of the metal material may increase production costs, there may be a need for an assembly structure of an electronic device, which can save the production costs while having no problem in maintaining the rigidity and performing the function of the electronic device.

An electronic device may include a housing structure. The housing structure may include a lateral member surrounding a space between first and second plates. The lateral member as above may be formed of a metal material (e.g., conductive part, conductive member, or conductive material) and a polymer material (e.g., nonconductive part, nonconductive member, or nonconductive material). The metal material may increase stiffness of the electronic device. Further, the metal material may be used to perform a designated function (e.g., antenna function) of the electronic device.

However, exposed portions of the metal material require a high-quality surface, a CNC process or a deposition (painting) process must be performed, and thus complex manufacturing operations are required.

SUMMARY

Provided is an electronic device including a housing assembly structure without exposed metal materials while maintaining stiffness.

In addition, provided is an electronic device including a housing assembly structure without exposed metal materials while maintaining a designated function of the electronic device.

Additional aspects will be set forth in part in the description which follows and, in part, will be apparent from the description, or may be learned by practice of the presented embodiments.

In accordance with an aspect of the disclosure, an electronic device includes: a first plate; a second plate; a lateral member provided around a space between the first plate and the second plate, the lateral member including a conductive part and a nonconductive part; a frame member provided at least partly along a border of the lateral member and at least partially forming a side surface of the electronic device; and a display in the space and facing the first plate. The frame member is coupled with the nonconductive part.

The lateral member may include a support member extending into the space, and wherein the support member may include the nonconductive part.

The nonconductive part may extend along the border of the lateral member.

The nonconductive part may form a closed loop around the lateral member.

The nonconductive part may be externally exposed between the frame member and the first plate and/or between the frame member and the second plate.

The frame member may completely cover the nonconductive part so the nonconductive part is not externally visible.

The frame member may include hook structures and the nonconductive part may define locking grooves configured to accommodate the hook structures.

The frame member may be coupled with the nonconductive part through at least one process of taping, fusing, or bonding.

The conductive part and the nonconductive part may be coupled with each other through insert injection.

The frame member may include any one or any combination of an injection part, glass fiber reinforced plastic (GFRP), or carbon fiber reinforced plastic (CFRP).

The electronic device may further include: a first waterproof member provided between the first plate and the nonconductive part; and a second waterproof member provided between the second plate and the nonconductive part. The space may be sealed through the first waterproof member and the second waterproof member.

The first waterproof member and/or the second waterproof member may include any one or any combination of a tape, an adhesive, silicone, a waterproof rubber, or urethane.

The frame member may be a replaceable decoration member.

The electronic device may further include: at least one conductive part extending through the nonconductive part; and a wireless communication circuit provided in the space and configured to transmit and/or receive a wireless signal in a designated frequency band through the at least one conductive part.

The at least one conductive part may not be covered by the frame member.

In accordance with an aspect of the disclosure, an electronic device includes: a first plate; a second plate; a lateral member provided around a space between the first plate and the second plate, the lateral member including a conductive part and a nonconductive part; a frame member extending along a border of the lateral member around the space; and a wireless communication circuit provided in the space and electrically connected to the conductive part.

The wireless communication circuit may be configured to use the conductive part as an antenna.

The conductive part may include a plurality of conductive parts that are provided throughout the nonconductive part, and the wireless communication circuit may be further configured to use at least two of the plurality of conductive parts as antennas.

The at least two of the plurality of conductive parts may be independently connected to the wireless communication circuit.

The electronic device may include including a display that is provided in the space and faces the first plate.

In accordance with an aspect of the disclosure, an electronic device includes: a first plate; a second plate; a lateral member provided around a space between the first plate and the second plate, the lateral member including a conductive part and a nonconductive part; a frame member extending along a border of the lateral member around the space; a wireless communication circuit provided in the space and electrically connected to the conductive part; and a display that is provided in the space and faces the first plate.

According to one or more embodiments of the disclosure, a conductive part that may be formed as a part of the lateral member, and in this regard do not require the high-quality surface processing, and production complexities may be minimized while providing stiffness and a corresponding function (e.g., antenna function).

In addition, various effects that are directly or indirectly grasped can be provided.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 4A is a diagram illustrating an operation of forming a lateral member according to various embodiments of the disclosure;

FIG. 4B is a view illustrating a state where a frame member is combined with a lateral member according to various embodiments of the disclosure;

DETAILED DESCRIPTION

Figure 1:
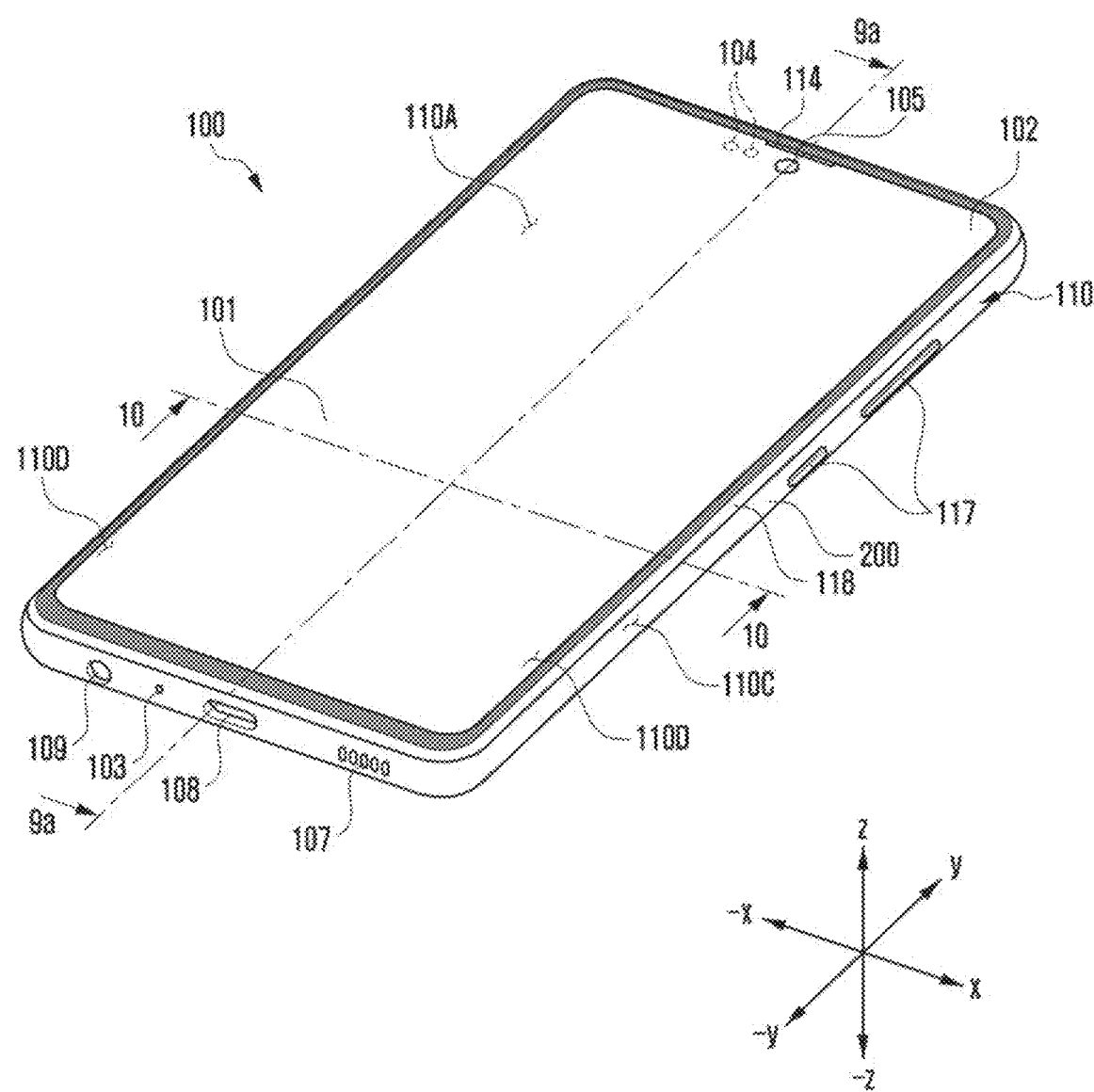
FIG. 1 is a perspective view of a front surface of an electronic device (e.g., mobile electronic device) according to various embodiments of the disclosure.

Embodiments will be described in detail with reference to the accompanying drawings. The same reference numerals are used for the same components in the drawings, and redundant descriptions thereof are omitted. Each embodiment provided in the following description is not excluded from being associated with one or more features of another example or another embodiment also provided herein or not provided herein but consistent with the present disclosure. As used herein, the terms "1st" or "first" and "2nd" or "second" may use corresponding components regardless of importance or order and are used to distinguish a component from another component without limiting the components. Expressions such as "at least one of" when preceding a list of elements, modify the entire list of elements and do not modify the individual elements of the list. For example, the expression, "at least one of a, b, or c," should be understood as including only a, only b, only c, both a and b, both a and c, both b and c, or all of a, b, and c.

Figure 2:
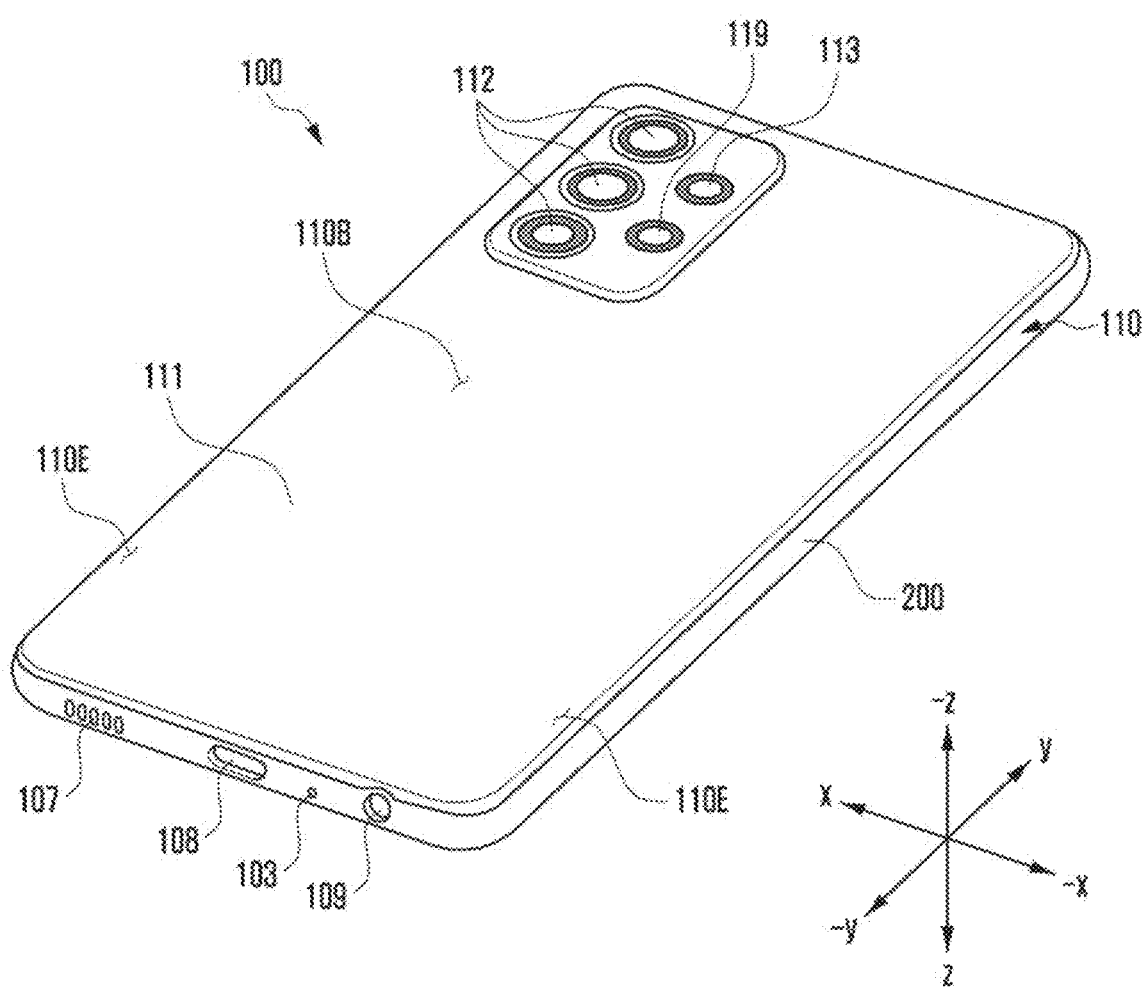
FIG. 2 is a perspective view of a rear surface of the electronic device of FIG. 1 according to various embodiments of the disclosure.

FIG. 1 is a perspective view illustrating a front surface of a mobile electronic device according to various embodiments, and FIG. 2 is a rear a perspective view illustrating a rear surface of the mobile electronic device shown in FIG. 1 according to various embodiments.

Referring to FIGS. 1 and 2, a mobile electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 110B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the mobile electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The mobile electronic device 100 may include at least one of a display 101, audio modules 103, 107 and 114, sensor modules 104 and 119, camera modules 105, 112 and 113, a key input device 117, a light emitting device, and connector hole 108. The mobile electronic device 100 may omit at least one (e.g., the key input device 117 or the light emitting device) of the above components, or may further include other components.

The display 101 may be exposed through a substantial portion of the front plate 102, for example. At least a part of the display 101 may be exposed through the front plate 102 that forms the first surface 110A and the first region 110D of the lateral surface 110C. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. The microphone hole 103 and the speaker holes 107 and 114 may be implemented as a single hole, or a speaker (e.g., a piezo speaker) may be provided without the speaker holes 107 and 114.

The sensor modules 104 and 119 may generate electrical signals or data corresponding to an internal operating state of the mobile electronic device 100 or to an external environmental condition. The sensor modules 104 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. Two or more lenses (infrared cameras, wide angle and telephoto lenses) and image sensors may be disposed on one side of the electronic device 100.

The key input device 117 may be disposed on the lateral surface 110C of the housing 110. The mobile electronic device 100 may not include some or all of the key input device 117 described above, and the key input device 117 which is not included may be implemented in another form such as a soft key on the display 101. The key input device 117 may include the sensor module disposed on the second surface 110B of the housing 110.

The light emitting device may be disposed on the first surface 110A of the housing 110. For example, the light emitting device may provide status information of the electronic device 100 in an optical form. The light emitting device may provide a light source associated with the operation of the camera module 105. The light emitting device may include, for example, a light emitting diode (LED), an IR LED, or a xenon lamp.

The connector hole 108 may include a first connector hole 108 adapted for a connector (e.g., a universal serial bus (USB) connector) for transmitting and receiving power and/or data to and from an external electronic device. The connector hole 108 may include a second connector hole (not shown) adapted for a connector (e.g., an earphone jack) for transmitting and receiving an audio signal to and from an external electronic device.

Some sensor modules 105 of camera modules 105 and 112, some sensor modules 104 of sensor modules 104 and 119, or an indicator may be arranged to be exposed through a display 101. For example, the camera module 105, the sensor module 104, or the indicator may be arranged in the internal space of an electronic device 100 so as to be brought into contact with an external environment through an opening of the display 101, which is perforated up to a front plate 102. According to an embodiment, an area corresponding to some camera module 105 of the display 101 is a part of an area in which content is displayed, and may be formed as a transmission area having designated transmittance. For example, the transmission area may be formed to have transmittance having a range of about 5% to about 30%. For example, the transmission area may be formed to have transmittance having a range of about 30% to about 50%. For example, the transmission area may be formed to have transmittance having a range of over 50%. The transmission area may include an area overlapped with a valid area (e.g., a field of view (FOV)) of the camera module 105 through which light imaged by an image sensor and for generating an image passes. For example, a transmission area of the display 101 may include an area in which the density of pixels and/or a wiring density are lower than that of surroundings. The camera module 305 may include, for example, under display camera (UDC). In an embodiment, some sensor modules 104 may be arranged to perform their functions without being visually exposed through the front plate 102 in the internal space of the electronic device. For example, in this case, an area of the display 101 facing the sensor module may not require a perforated opening.

According to various embodiments, an electronic device 100 has a bar-type or plate-type appearance, but the disclosure is not limited thereto. For example, the illustrated electronic device 100 may be a part of a foldable electronic device, a slidable electronic device, a stretchable electronic device, and/or a rollable electronic device. The "foldable electronic device", the "slidable electronic device", the "stretchable electronic device", and/or the "rollable electronic device" may be an electronic device at least a part of which is folded thanks to a bendable display (e.g., the display 330 in FIG. 3) may refer, for example, to an electronic device in which the display (e.g., the display 330 in FIG. 3) is bendable and thus at least partially folded, an electronic device in which at least a portion of the display is wound or rolled, an electronic device in which a region of the display is at least partially expandable, and/or an electronic device in which the display is capable of being received in the inside of a housing (e.g., the housing (e.g., the housing 110 in FIGS. 1 and 2). In the case of the foldable electronic device, the slidable electronic device, the stretchable electronic device, and/or the rollable electronic device, a user may use a screen display region in an expanded state by unfolding the display or exposing a greater area of the display to the outside if necessary.

Figure 3A:
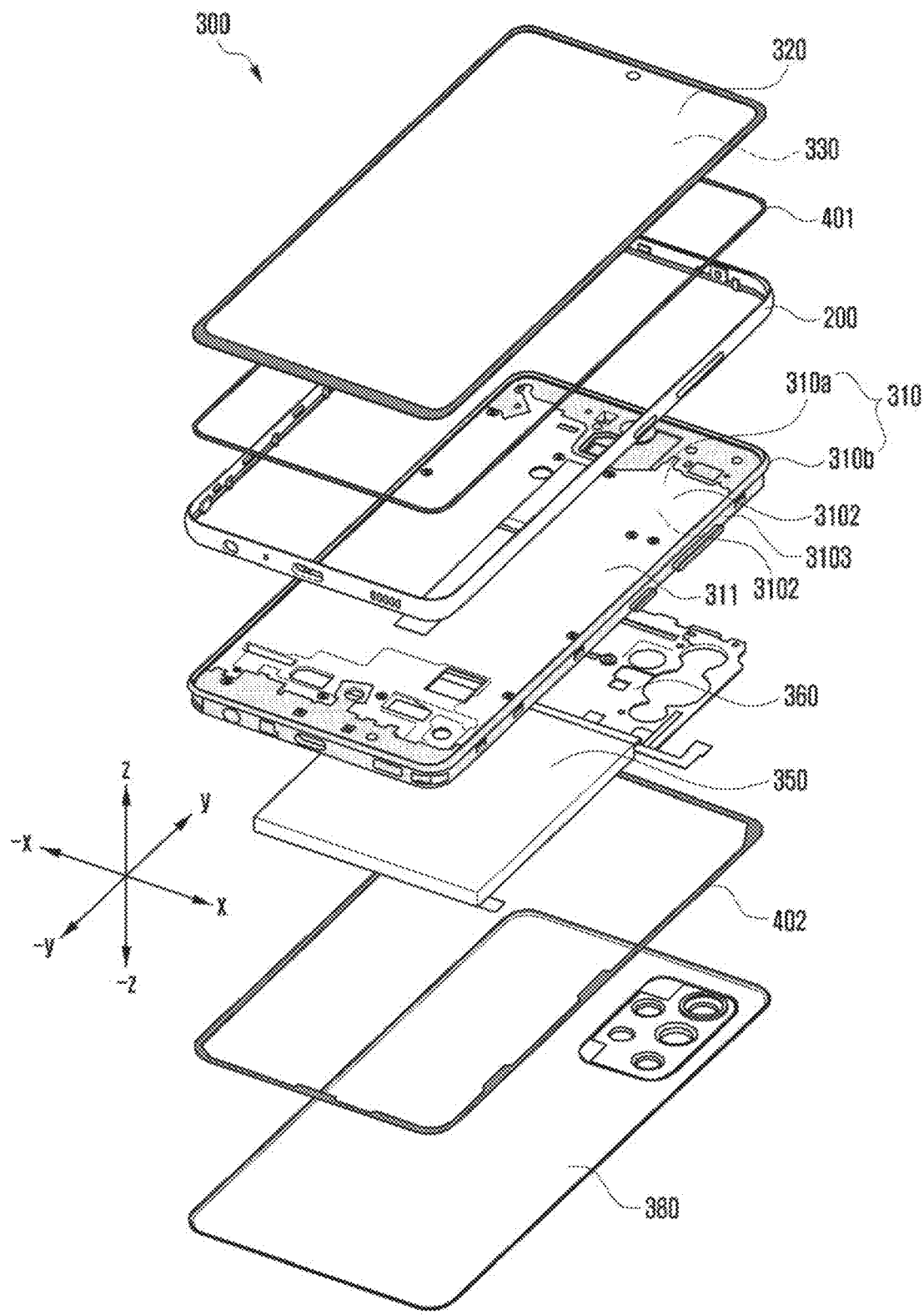
FIGS. 3A and 3B are exploded perspective views of the electronic device of FIG. 1 when viewed from front and rear surfaces thereof according to various embodiments of the disclosure.
Figure 3B:
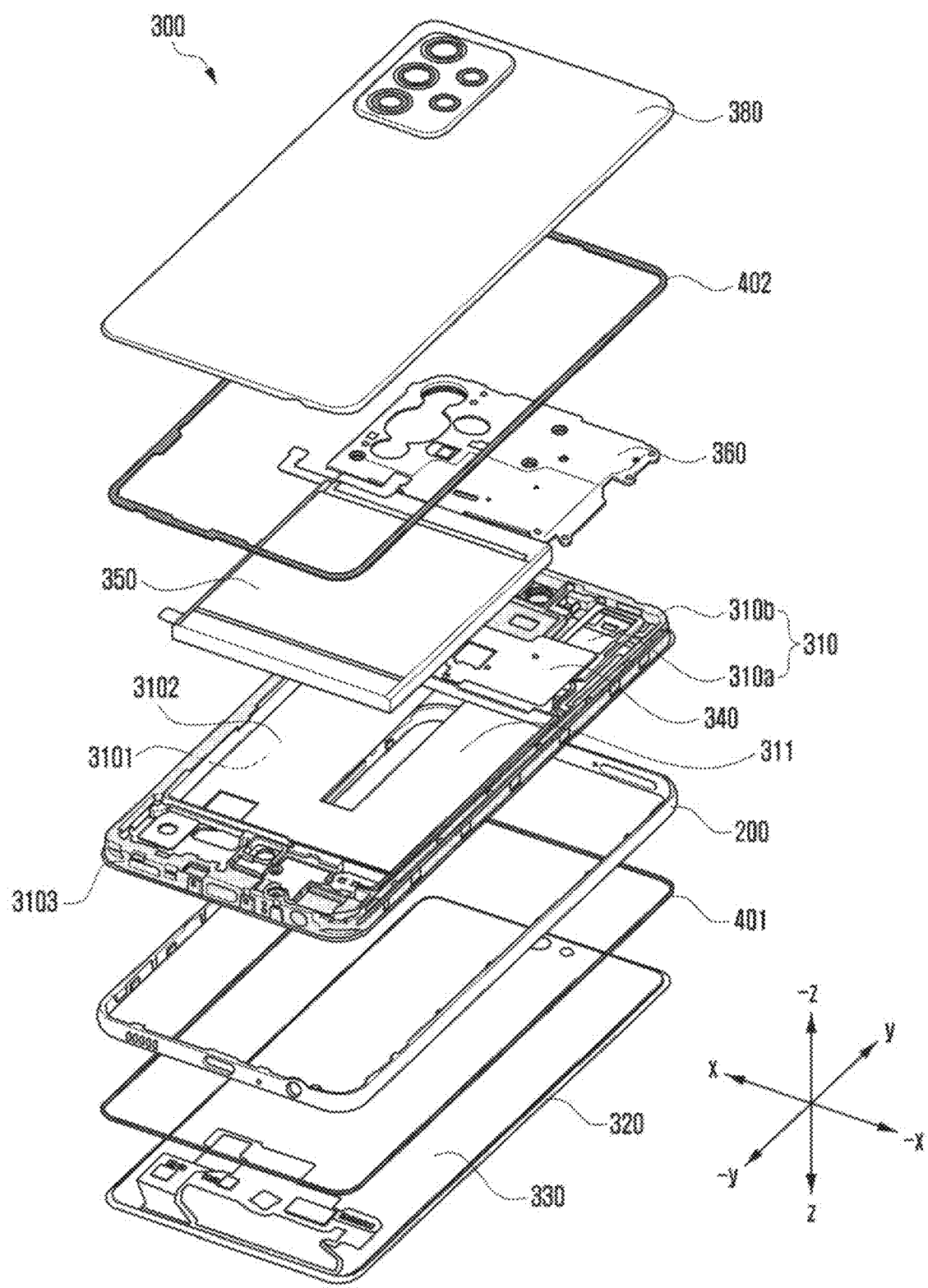

FIGS. 3A and 3B are exploded perspective views of the electronic device of FIG. 1 when viewed from front and rear surfaces thereof according to various embodiments.

An electronic device 300 of FIGS. 3A and 3B may be similar to the electronic device 100 of FIGS. 1 and 2 at least partly, or other electronic device.

With reference to FIGS. 3A and 3B, the electronic device 300 (e.g., electronic device 100 of FIGS. 1 and 2) may include a lateral member 310 (e.g., lateral bezel structure) (e.g., lateral bezel structure 118 of FIGS. 1 and 2), a support member 311 (e.g., support structure), a first plate 320 (e.g., front plate 102 or front cover of FIG. 1), a display 330 (e.g., display 101 of FIG. 1), at least one board 340 (e.g., printed circuit board (PCB), flexible PCB (FPCB), or rigid-flexible PCB (R-FPCB)), a battery 350, an additional support member 360 (e.g., rear case), an antenna, and a second plate 380 (e.g., rear plate 111 or rear cover of FIG. 2). In some embodiments, at least one (e.g., support member 311 or additional support member 360) of the constituent elements may be omitted, or additional elements may be included. At least one of the constituent elements of the electronic device 300 may be the same as or may be similar to at least one of the constituent elements of the electronic device 100 of FIGS. 1 and 2, and the duplicate explanation thereof may be omitted.

According to various embodiments, the lateral member 310 may include a first surface 3101 facing a first direction (e.g., z-axis direction), a second surface 3102 facing direction opposite the direction of the first surface 3101, and a side surface 3103 surrounding a space between the first surface 3101 and the second surface 3102. According to an embodiment, the lateral member 310 may be a bracket disposed inside the electronic device 300. According to an embodiment, at least a part of the side surface 3103 may be externally visible and form an appearance of the electronic device. According to an embodiment, the support member 311 may extend from the lateral member 310 toward an inner space (e.g., inner space 3001 of FIG. 9A) of the electronic device 300. For example, the support member 311 may extend from a conductive part 310*a* (e.g., metal material) and/or a nonconductive part 310*b* (e.g., nonmetal material (e.g., polymer)) of the lateral member 310. In some embodiments, the support member 311 may be disposed separately from the lateral member 310. According to an embodiment, the lateral member 310 and/or the support member 311 may be formed, for example, as the conductive part 310*a* (e.g., metal material) and/or the nonconductive part 310*b* (e.g., nonmetal material (e.g., polymer)). According to an embodiment, the nonconductive part 310*b* may be combined with the conductive part 310*a* in an injection manner. According to an embodiment, the lateral member 310 may be formed so that the nonconductive part 310*b* is disposed along at least the border of the lateral member 310. According to an embodiment, the support member 311 may be disposed to support at least a part of the display 330 through the first surface 3101 and to support at least a part of at least one board 340 and/or the battery 350 through the second surface 3102.

According to an embodiment, the at least one board 340 may include a processor, a memory, and/or an interface.

According to an embodiment, the processor may include, for example, one or more of a central processing unit, an application processor, a graphic processing device, an image signal processor, a sensor hub processor, or a communication processor. According to an embodiment, the memory may include, for example, a volatile memory and/or a nonvolatile memory. According to an embodiment, the interface may include, for example, a high definition multimedia interface (HDMI), a universal serial bus (USB) interface, a Secure Digital (SD) card interface, and/or an audio interface. For example, the interface may electrically or physically connect the electronic device 300 to an external electronic device, and may include a USB connector, an SD card connector, a MultiMediaCard (MMC) connector, or an audio connector. According to an embodiment, the battery 350 is a device for supplying a power to at least one constituent element of the electronic device 300, and may include, for example, a non-rechargeable primary cell, a rechargeable secondary cell, or a fuel cell. At least a part of the battery 350 may be disposed, for example, on substantially the same plane as the plane of the at least one board 340. According to an embodiment, the battery 350 may be fixed in the electronic device 300. In some embodiments, the battery 350 may be detachably disposed on the electronic device 300.

According to various embodiments, an antenna may be disposed between the second plate 380 and the battery 350. The antenna may include, for example, a near field communication (NFC) antenna, a wireless charging antenna, and/or a magnetic secure transmission (MST) antenna. For example, the antenna may perform a short-range communication with an external device, or may wirelessly transmit and receive the necessary power for charging. In some embodiments, an antenna structure may be formed by a part or a combination of the lateral member 310 and/or the support member 311. In some embodiments, the electronic device 300 may further include a digitizer for detecting an external electronic pen.

According to various embodiments, the electronic device 300 may include a frame member 200 combined with at least a part of the side surface 3103 of the lateral member 310. According to an embodiment, the frame member 200 may form a closed loop along the border of the side surface 3103. According to an embodiment, at least a part of the lateral member 310 may be externally visible between the frame member 200 and the first plate 320. For example, the nonconductive part 310*b* may be externally visible. In some embodiments, the lateral member 310 may be disposed not to be visible from the outside. According to an embodiment, the frame member 200 may be combined with the nonconductive part 310*b* of the lateral member 310. According to an embodiment, the frame member 200 may be disposed on at least a part of the side surface 3103 of the electronic device 300, and thus may be utilized as a decoration member (e.g., deco member or deco surface). For example, the frame member 200 may be at least a part of the side surface of the electronic device 300. According to an embodiment, the frame member 200 may be formed of at least one of an injection part, glass fiber reinforced plastic (GFRP), carbon fiber reinforced plastic (CFRP), or a metal material (e.g., Al or SUS).

According to various embodiments, the electronic device 300 may include at least one waterproof member 401 and 402. According to an embodiment, the first waterproof member 401 may be disposed between the first surface 3101 of the lateral member 310 and the first plate 320, and the second waterproof member 402 may be disposed between the second surface 3102 of the lateral member 310 and the second plate 380. According to an embodiment, the first waterproof member 401 may be disposed between the first plate 320 and the nonconductive part 310b of the lateral member 310. According to an embodiment, the second waterproof member 402 may be disposed between the second plate 380 and the nonconductive part 310b of the lateral member 310. According to an embodiment, the at least one waterproof member 401 and 402 may provide the sealed inner space (e.g., inner space 3001 of FIG. 9A) of the electronic device 300, and thus may block an inflow of external foreign substances or moisture. According to an embodiment, the at least one waterproof member 401 and 402 may provide a combining force for combining the first plate 320 and the second plate 380 with each other and the lateral member 310. According to an embodiment, the at least one waterproof member 401 and 402 may include at least one of a tape, an adhesive, silicone, a waterproof rubber, or urethane.

According to various embodiments, the conductive part 310a of the lateral member 310 may be disposed not to be visible from the outside, and in this regard maybe surrounded by the nonconductive part 310b, or may be hidden through the frame member 200. Accordingly, because the conductive part 310a is not externally visible, a high-quality surface processing procedure is unnecessary, and thus the production costs of the electronic device 300 can be saved.

Hereinafter, an assembly structure of the electronic device 300 will be described in detail.

FIG. 4A is a diagram illustrating an operation of forming a lateral member according to various embodiments. FIG. 4B is a view illustrating a state where a frame member is combined with a lateral member according to various embodiments.

With reference to FIGS. 4A and 4B, in order to form the lateral member 310, the conductive part 310a (e.g., metal material or conductive material), such as portion (a) of FIG. 4A, may be prepared. The conductive part 310a may be formed in a shape considering the disposition structure of the electronic components disposed in the inner space (e.g., inner space 3001 of FIG. 9A) of the electronic device 300. According to an embodiment, the conductive part 310a may be formed with a structure that can increases stiffness of the electronic device 300. According to an embodiment, the conductive part 310a may be formed of a metal material (e.g., Al, SUS, or magnesium) through a CNC process or a die casting process. According to an embodiment, the conductive part 310a may be combined with the nonconductive part 310b (e.g., injection part), for example as shown in portion (b) of FIG. 4A, and thus may be formed as the lateral member 310, for example as shown in portion (c) of FIG. 4A. For example, the nonconductive part 310b may be combined with the conductive part 310a through the injection process. In some embodiments, the nonconductive part 310b may be structurally combined with the conductive part 310a. In this case, the nonconductive part 310b may surround the conductive part 310a along the border of the lateral member 310. According to an embodiment, at least a part of the conductive part 310a may exposed to an exterior of the electronic device 300. In some embodiments, the at least a part of the conductive part 310a may be internal and not visible from the outside through the nonconductive part 310b.

According to various embodiments, the lateral member 310 may be combined with the frame member 200. According to an embodiment, the frame member 200 may be applied to at least a part of the side surface (e.g., side surface 110C of FIG. 1) of the electronic device 300. According to an embodiment, the frame member 200 may be combined with the nonconductive part 310b along the border of the lateral member 310. According to an embodiment, the frame member 200 may be combined with the lateral member 310 through a structural connection (e.g., hooking method). In some embodiments, the frame member 200 may be combined with the nonconductive part 310b of the lateral member 310 through at least one process of taping, fusing, or bonding. In some embodiments, at least a part of the frame member 200 may be combined with at least a part of the conductive part 310a. In this case, the conductive part 310a may not be visible from the outside through the frame member 200.

Figure 5:
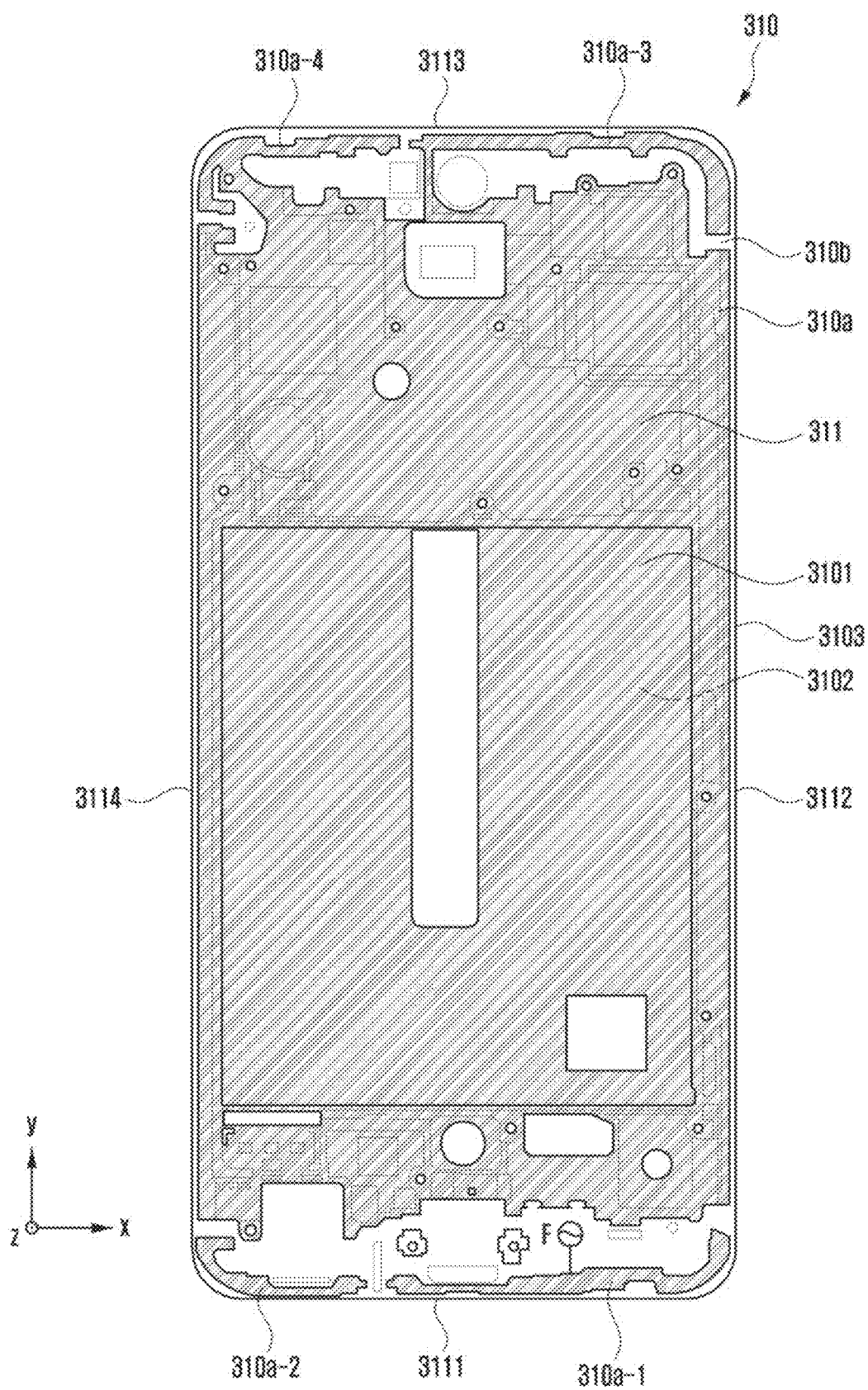
FIG. 5 is a configuration diagram of a lateral member according to various embodiments of the disclosure.

FIG. 5 is a configuration diagram of a lateral member according to various embodiments.

With reference to FIG. 5, the lateral member 310 may include the first surface 3101, the second surface 3102 facing an opposite direction to the direction of the first surface 3101, and the side surface 3103 surrounding the space between the first surface 3101 and the second surface 3102. According to an embodiment, the lateral member 310 may include the support member 311 extending from the side surface 3103 to the space. According to an embodiment, the side surface 3103 may include a first side surface 3111 formed to have a first length along the first direction (e.g., x-axis direction), a second side surface 3112 extending from the first side surface 3111 and having a second length that is longer than the first length in the second direction (e.g., y-axis direction) that is perpendicular to the first direction, a third side surface 3113 extending from the second side surface 3112 in parallel to the first side surface 3111, and having the first length, and a fourth side surface 3114 extending from the third side surface 3113 to the first side surface 3111 in parallel to the second side surface 3112, and having the third length. According to an embodiment, the first side surface 3111, the second side surface 3112, the third side surface 3113, and the fourth side surface 3114, and at least a part of the support member 311 extending therefrom may be formed as the nonconductive part 310b.

According to various embodiments, the lateral member 310 may include at least one unit conductive part 310a-1, 310a-2, 310a-3, and 310a-4 that is separated from the conductive part 310a by the nonconductive part 310b (e.g., nonconductive material or polymer). According to an embodiment, the at least one unit conductive part 310a-1, 310a-2, 310a-3, and 310a-4 may include the first unit conductive part 310a-1 and the second unit conductive part 310a-2 disposed to be spaced apart from the first side surface 3111, and may include the third unit conductive part 310a-3 and the fourth unit conductive part 310a-4 disposed to be spaced apart from the third side surface 3113. For example, the first unit conductive part 310a-1 and/or the second unit conductive part 310a-2 may be disposed to have a separation distance in the range of about 1 mm to 10 mm from the first side surface 3111. For example, the third unit conductive part 310a-3 and/or the fourth unit conductive part 310a-4 may be disposed to have a separation distance in the range of about 1 mm to 10 mm from the third side surface 3113. According to an embodiment, the first unit conductive part 310a-1 may operate as an antenna through the wireless communication circuit F (e.g., feeding part) disposed in the inner space (e.g., inner space 3001 of FIG. 9A) of the electronic device (e.g., electronic device 300 of FIG. 3A). According to an embodiment, the wireless communication circuit F may be disposed on the board (e.g., board 340 of FIG. 3A) of the electronic device (e.g., 300 of FIG. 3A), and may be electrically connected to the first unit conductive part 310a-1. According to an embodiment, the wireless communication circuit F may be configured to transmit and/or receive a wireless signal in at least one designated frequency band through the first unit conductive part 310a-1. According to an embodiment, the at least one frequency band may include a legacy band (e.g., a band in the range of about 600 MHz to 6000 MHz). According to an embodiment, the second unit conductive part 310a-2, the third unit conductive part 310a-3, and the fourth unit conductive part 310a-4 may be electrically connected to the wireless communication circuit F and may operate as antennas in substantially the same manner.

According to various embodiments, the at least one unit conductive part 310a-1, 310a-2, 310a-3, and 310a-4 may not be visible from the side surface 3103 through the nonconductive part 310b on the lateral member 310. In some embodiments, the at least one unit conductive part 310a-1, 310a-2, 310a-3, and 310a-4 may at least partially exposed through the side surface 3103 on the lateral member 310. In this case, the exposed parts of the at least one unit conductive part 310a-1, 310a-2, 310a-3, and 310a-4 may be covered by the frame member (e.g., frame member 200 of FIG. 3A) so as to not be visible. Accordingly, the disposition structure in which the at least one unit conductive part 310a-1, 310a-2, 310a-3, and 310a-4, being used as the antennas, is not externally visible, which may reduce the performance deterioration of the antennas, and improve appearance of the electronic device.

Figure 6A:
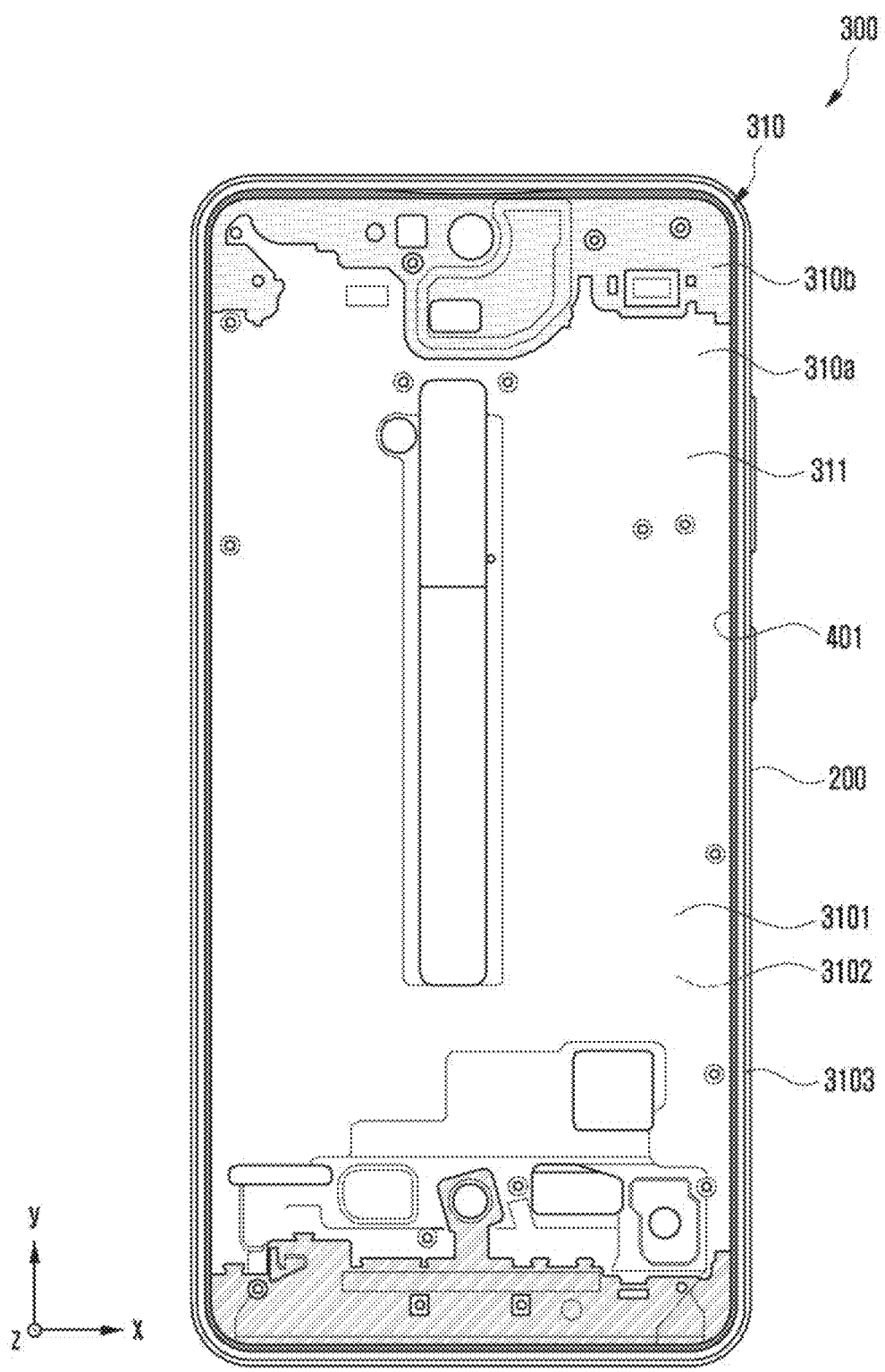
FIGS. 6A and 6B are a plan view and an exploded perspective view of an electronic device to which a first waterproof member is applied according to various embodiments of the disclosure.
Figure 6B:
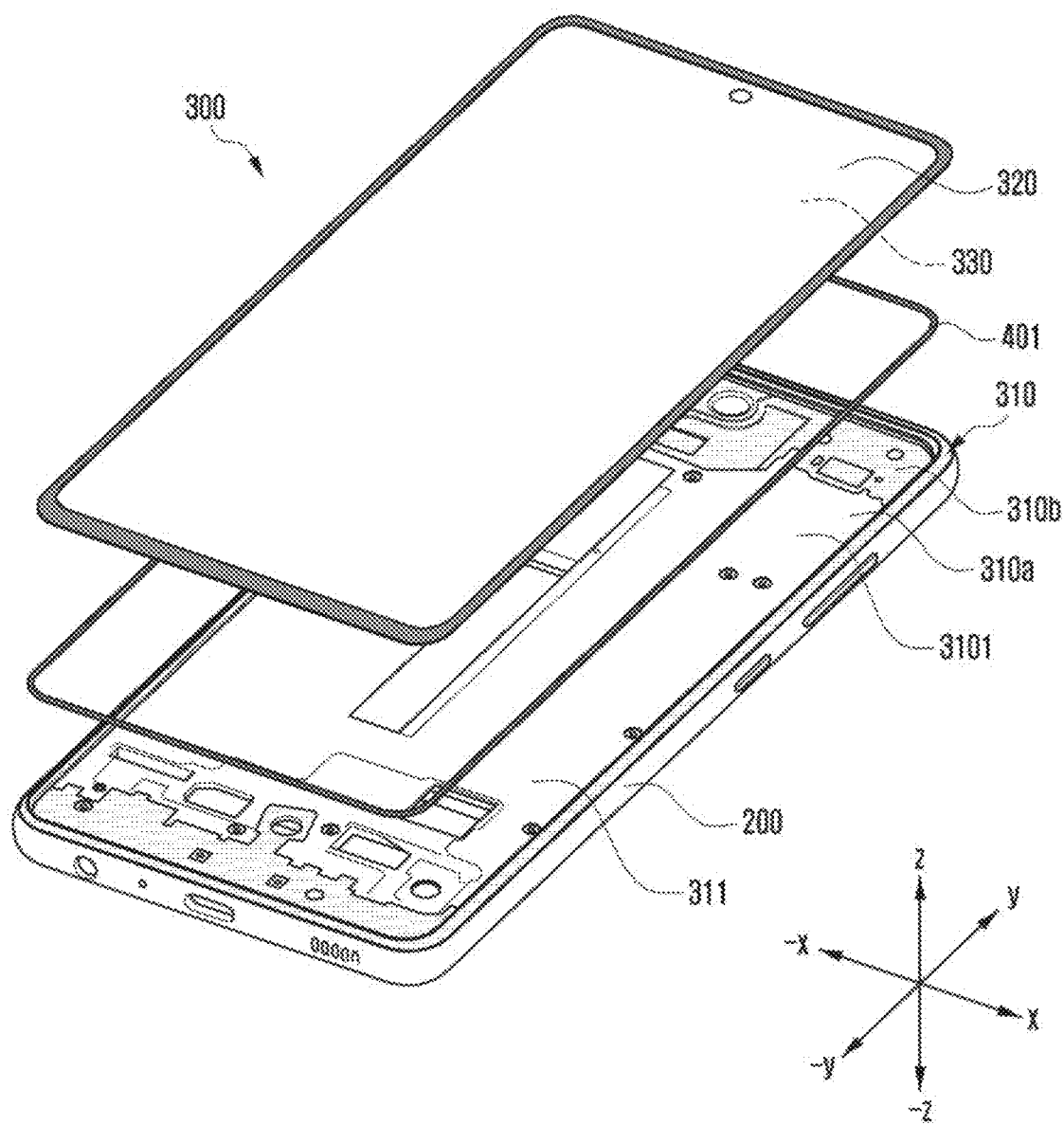

FIGS. 6A and 6B are a plan view and an exploded perspective view of an electronic device to which a first waterproof member is applied according to various embodiments.

With reference to FIGS. 6A and 6B, the electronic device 300 may include the first waterproof member 401 disposed between the lateral member 310 and the first plate 320 (e.g., front cover). According to an embodiment, the first waterproof member 401 may be disposed on the nonconductive part 310b along the border of the first surface 3101 of the lateral member 310, near the boundary of the side surface 3103 and the support member 311. According to an embodiment, through the first waterproof member 401, a sealed space for the display 330 may be provided between the first plate 320 and the first surface 3101 of the lateral member 310.

Figure 7A:
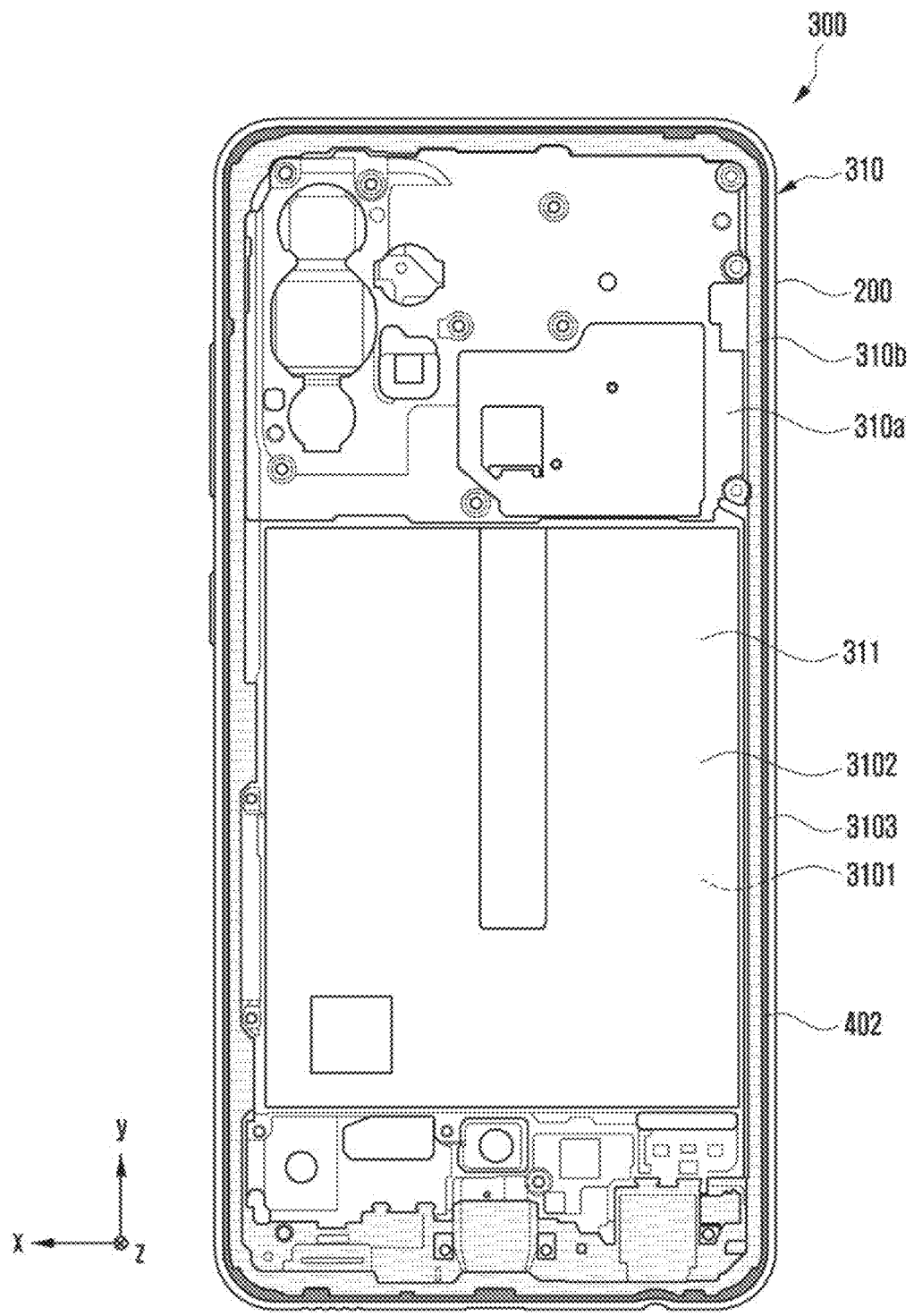
FIGS. 7A and 7B are a rear view and an exploded perspective view of an electronic device to which a second waterproof member is applied according to various embodiments of the disclosure.
Figure 7B:
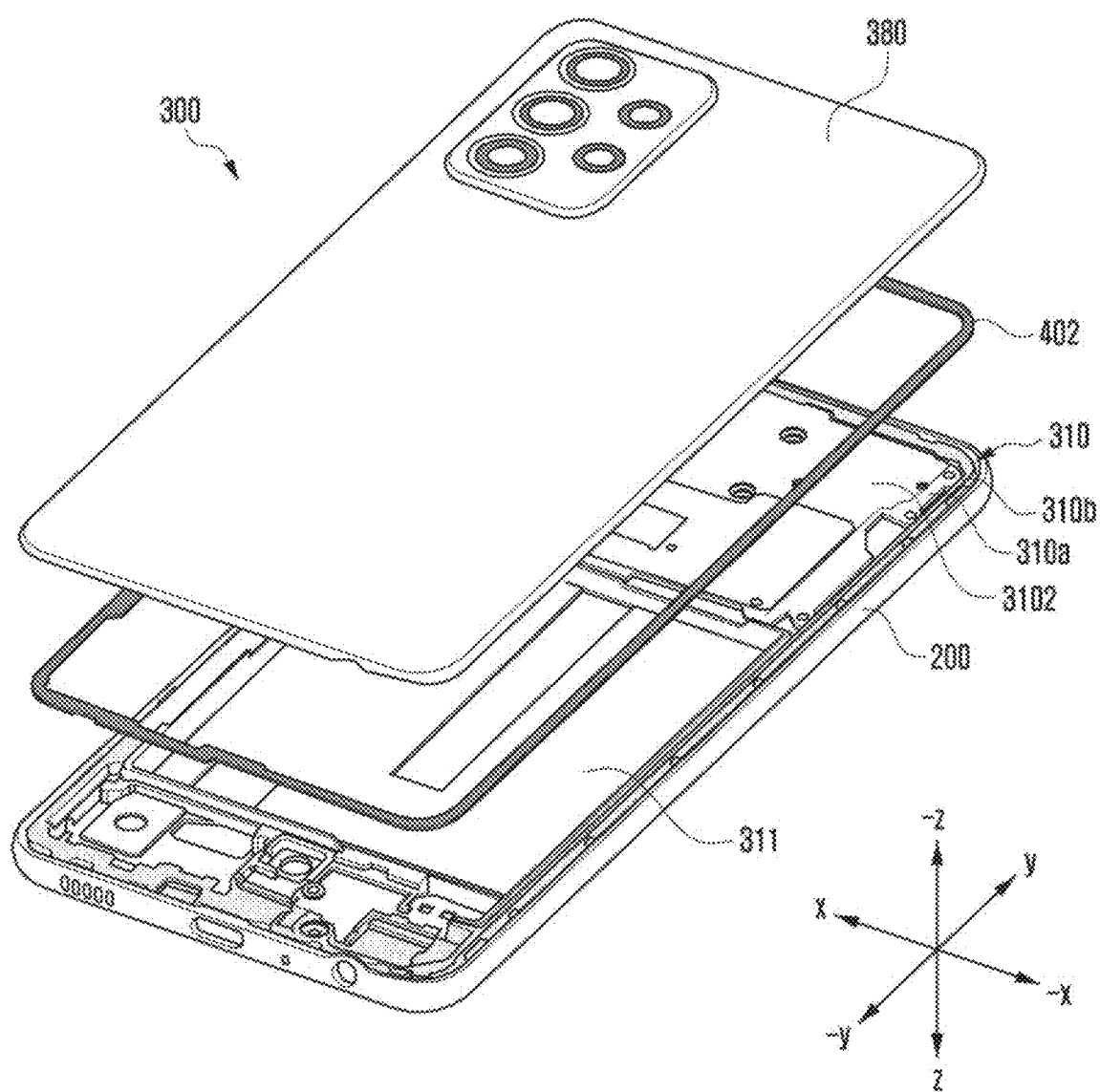

FIGS. 7A and 7B are a rear view and an exploded perspective view of an electronic device to which a second waterproof member is applied according to various embodiments.

With reference to FIGS. 7A and 7B, the electronic device 300 may include the second waterproof member 402 disposed between the lateral member 310 and the second plate 380 (e.g., front cover). According to an embodiment, the second waterproof member 42 may be disposed on the nonconductive part 310b along the border of the second surface 3102 of the lateral member 310, near the boundary of the side surface 3103 and the support member 311. According to an embodiment, through the second waterproof member 402, a sealed space may be provided between the second plate 380 and the lateral member 310. Accordingly, because the first plate 320 and the second plate 380 are combined with the first surface 3101 and the second surface 3102 of the lateral member 310 through the first waterproof member 401 and the second waterproof member 402, the electronic device 300 may include the sealed waterproof space.

Figure 8A:
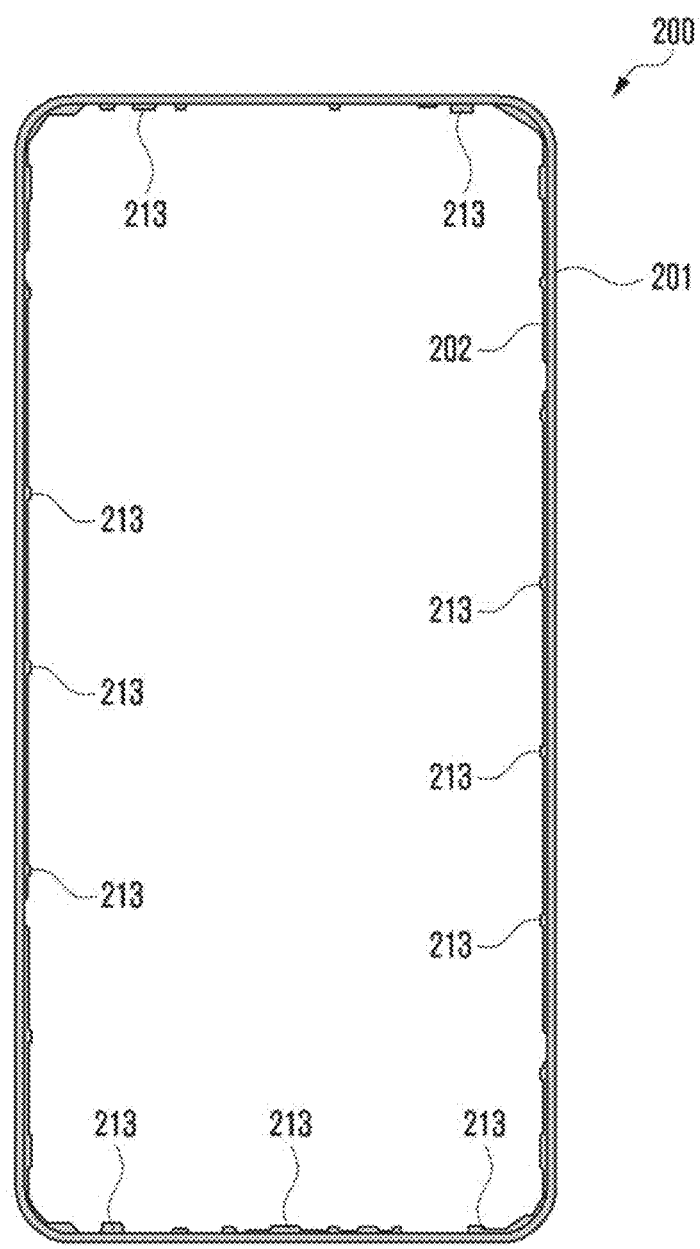
FIGS. 8A and 8B are views illustrating a combined structure of a lateral member and a frame member according to various embodiments of the disclosure.
Figure 8B:
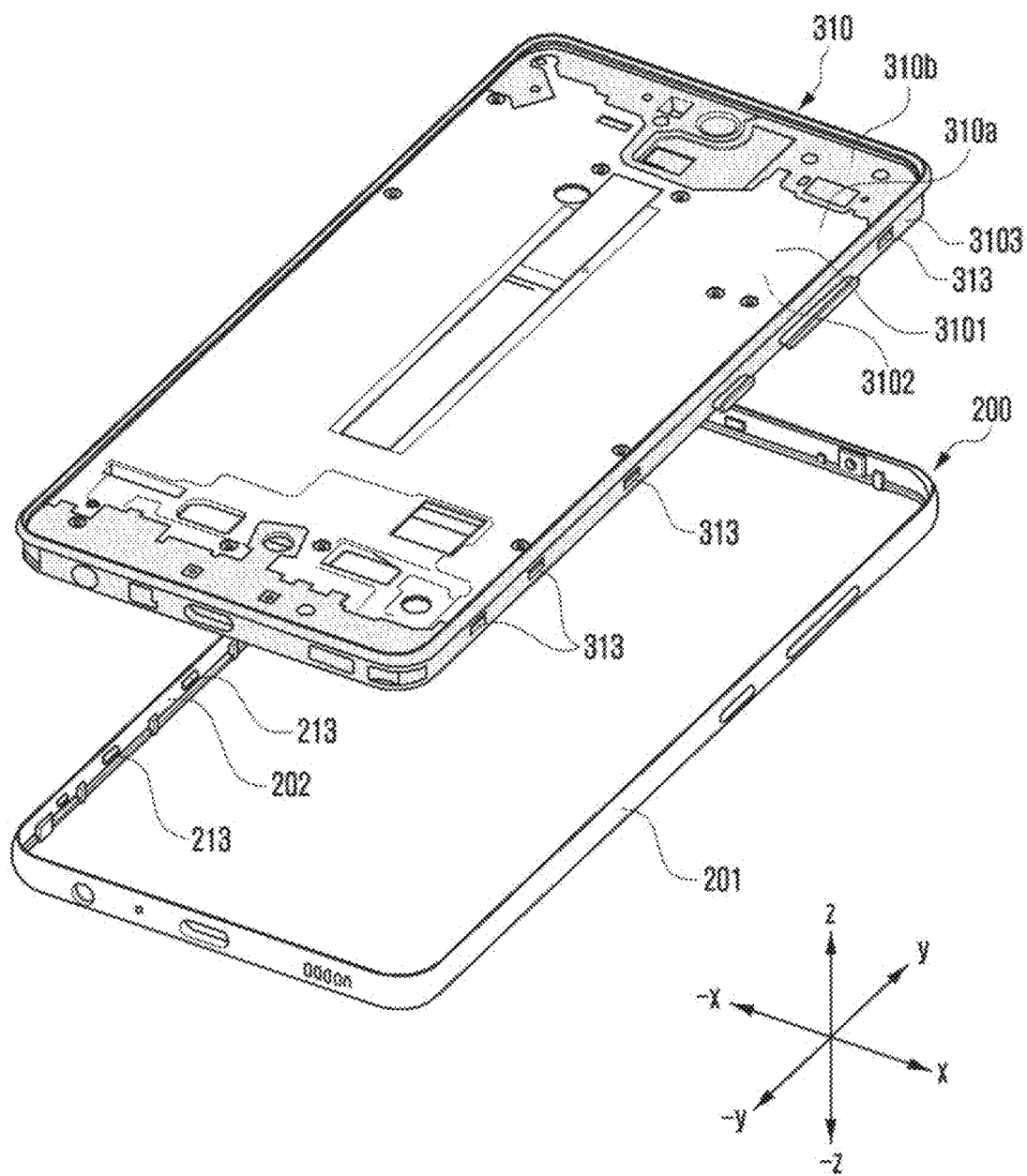

FIGS. 8A and 8B are views illustrating a combined structure of a lateral member and a frame member according to various embodiments.

With reference to FIGS. 8A and 8B, the electronic device 300 may include the frame member 200 combined with at least a part of the lateral member 310 and the side surface 3103 of the lateral member 310. According to an embodiment, the frame member 200 may form at least a part of the side surface of the electronic device 300. In this case, the at least a part of the side surface 3103 of the electronic device 300 may be replaced by an outer surface 201 of the frame member 200. According to an embodiment, the electronic device 300 may include a combined structure that includes the frame member 200 and the lateral member 310. According to an embodiment, the combined structure may include locking protrusions 213 formed at intervals on an inner surface 202 of the frame member 200 and locking grooves 313 for accommodating the locking protrusions 213 therein. For example, because the locking protrusions 213 and the locking grooves 313 are formed in a snap-fit structure including a hook shape, the frame member 200 may be separable from the lateral member 310. Through such a separable structure, the frame member can be easily replaced by other frame members having various colors and/or textures, and thus the electronic device 300 may be repaired and customized.

According to various embodiments, the locking grooves 313 may be formed through the side surface 3103 formed of the nonconductive part 310b of the lateral member 310. For example, the locking grooves 313 may be formed together during injection of the nonconductive part 310b. According to an embodiment, the locking protrusions 213 may be integrally formed in a manner of being protruded from the inner surface 202 of the frame member 200. In some embodiments, the locking grooves 313 may be formed on the frame member 200, and the locking protrusions 213 may be formed on the lateral member 310, or they may be alternately formed.

Figure 9A:
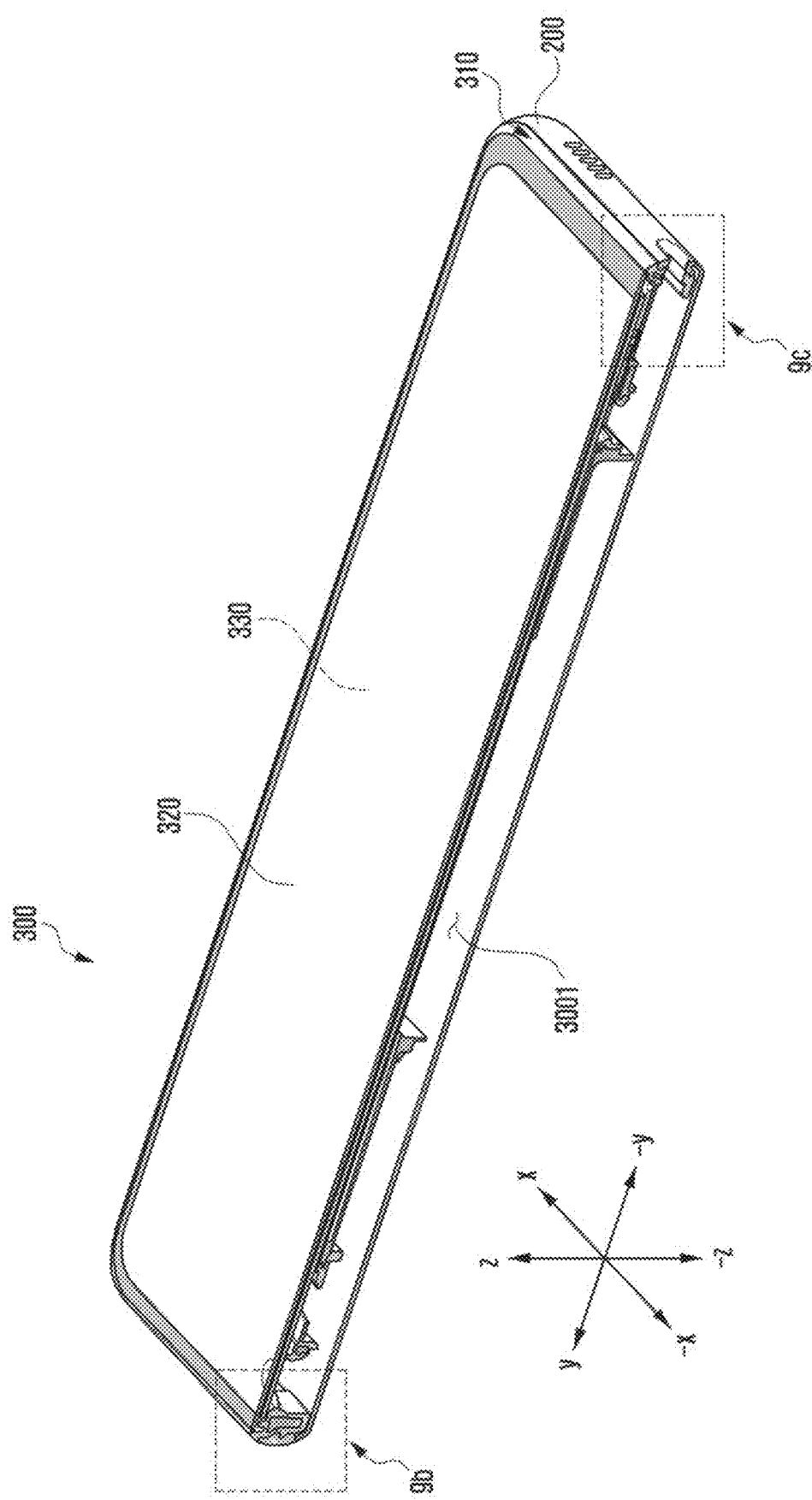
FIG. 9A is a cutaway perspective view of an electronic device when viewed along line 9a-9a of FIG. 1 according to various embodiments of the disclosure.
Figure 9B:
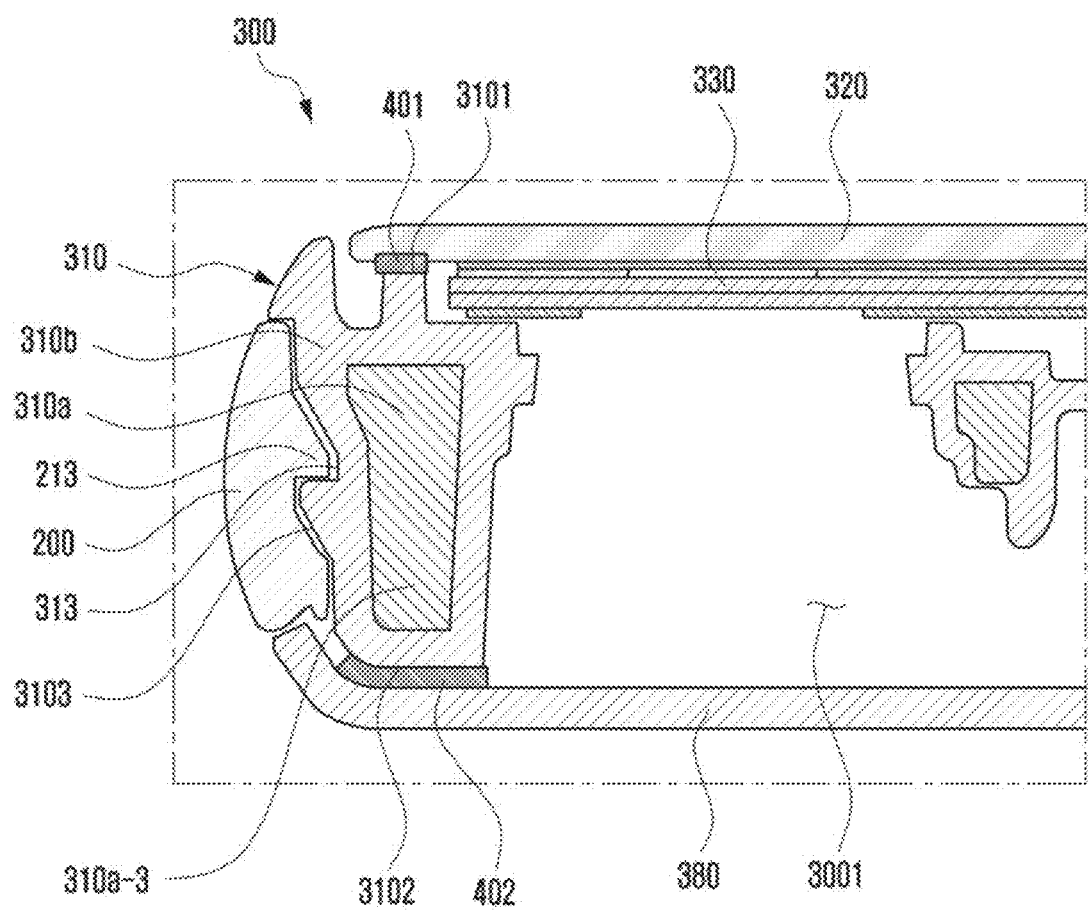
FIG. 9B is a partial cross-sectional view of area 9b of FIG. 9A according to various embodiments of the disclosure.
Figure 9C:
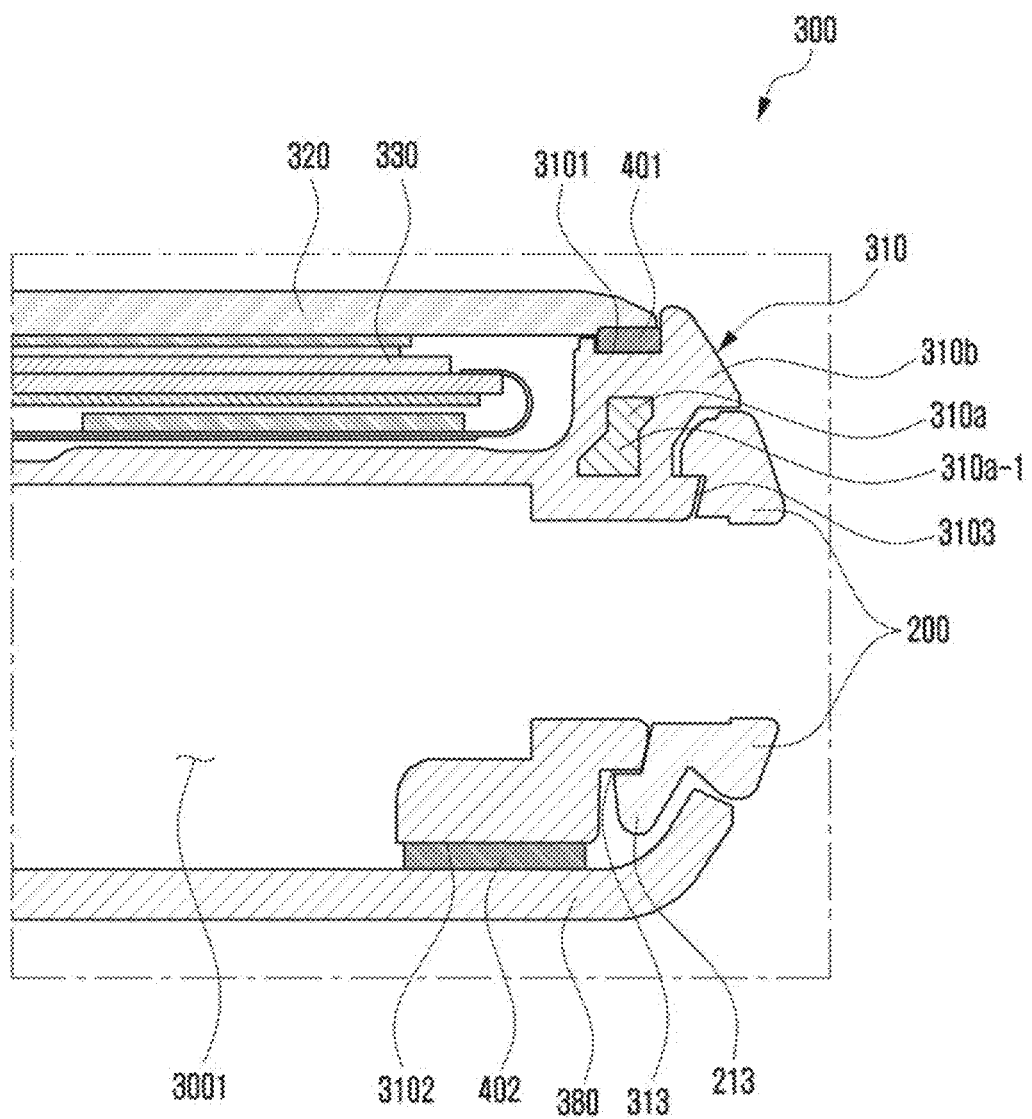
FIG. 9C is a partial cross-sectional view of area 9c of FIG. 9A according to various embodiments of the disclosure.
Figure 10:
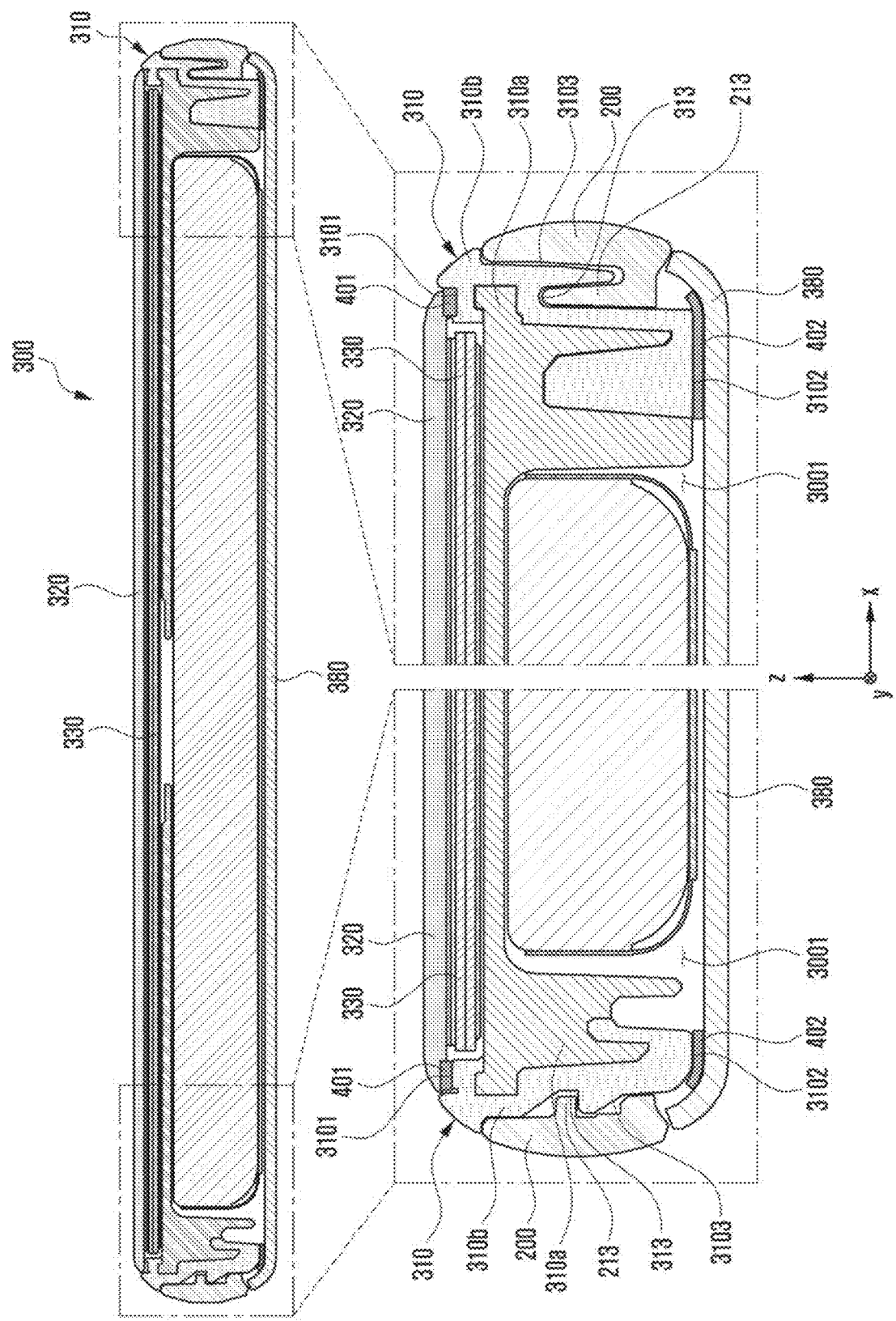
FIG. 10 is a cross-sectional view of an electronic device when viewed along line 10-10 of FIG. 1 according to various embodiments of the disclosure.
Figure 11:
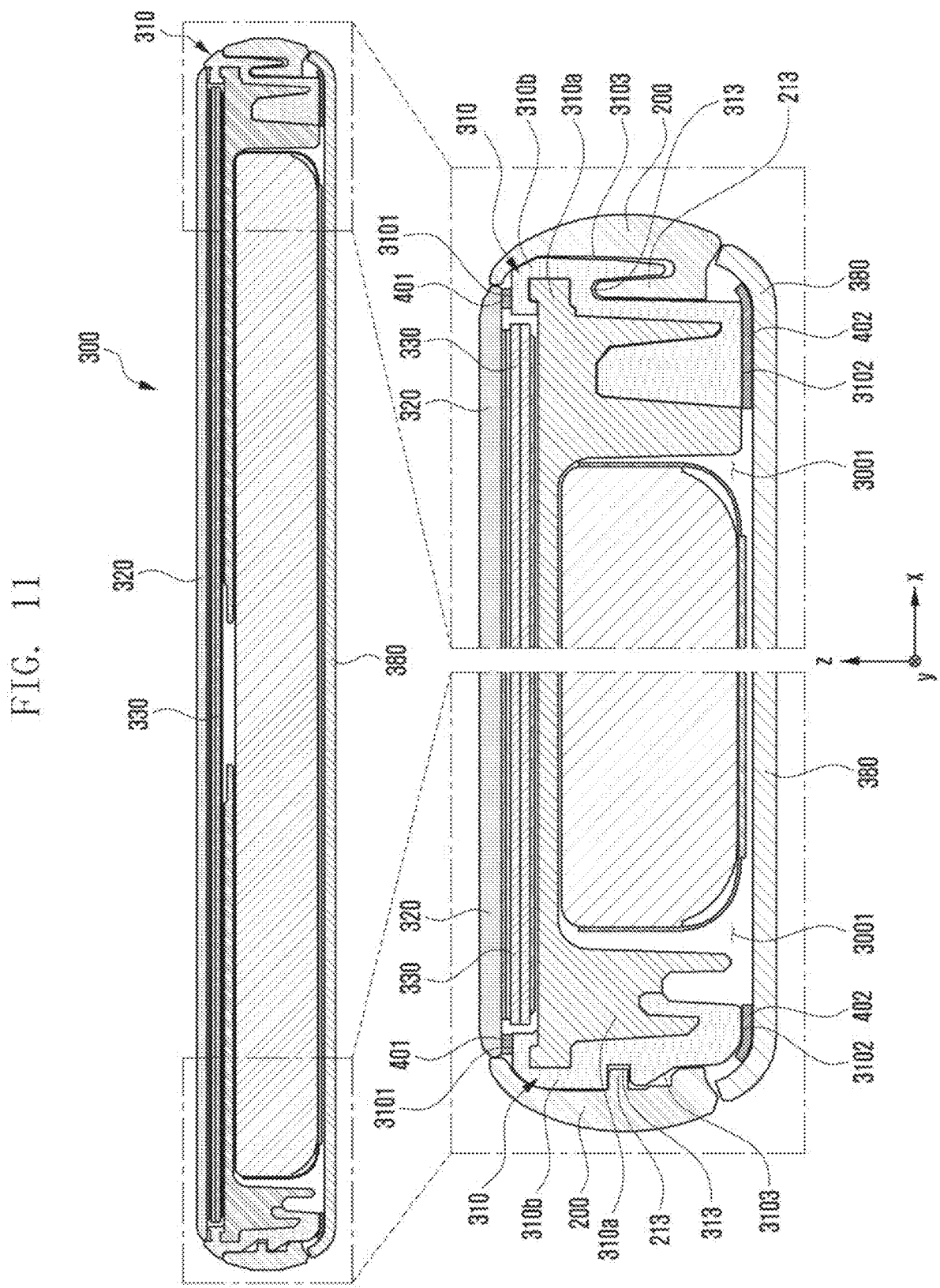
FIG. 11 is a cross-sectional view of an electronic device according to various embodiments of the disclosure.

FIG. 9A is a cutaway perspective view of an electronic device when viewed along line 9a-9a of FIG. 1 according to various embodiments. FIG. 9B is a partial cross-sectional view of an electronic device with an area 9b of FIG. 9A enlarged according to various embodiments. FIG. 9C is a partial cross-sectional view of an electronic device with an area 9c of FIG. 9A enlarged according to various embodiments. FIG. 10 is a cross-sectional view of an electronic device when viewed along line 10-10 of FIG. 1 according to various embodiments. FIG. 11 is a cross-sectional view of an electronic device according to various embodiments.

With reference to FIGS. 9A, 9B, 9C and 10, the electronic device 300 may include the first plate 320, the second plate 380 facing an opposite direction to the direction of the first plate 320, and the lateral member 310 surrounding the space 3001 between the first plate 320 and the second plate 380. According to an embodiment, the lateral member 310 may include the conductive part 310a (e.g., metal material) and the nonconductive part 310b (e.g., polymer material) combined with the conductive part 310a. According to an embodiment, the first plate 320 may be attached to the first surface 3101 of the lateral member 310 through the first waterproof member 401. In this case, the first waterproof member 401 may be disposed on the nonconductive part 310b of the lateral member 310. According to an embodiment, the second plate 380 may be attached to the second surface 3102 of the lateral member 310 through the second waterproof member 402. In this case, the second waterproof member 402 may be disposed on the nonconductive part 310*b* of the lateral member 310. Accordingly, the electronic device 300 the inner space 3001, which is formed through the first plate 320 and the second plate 380 attached to the lateral member 310 through the first waterproof member 401 and the second waterproof member 402, may be waterproofed.

According to various embodiments, the electronic device 300 may include the frame member 200 combined with at least a part of the side surface 3103 of the lateral member 310. According to an embodiment, the frame member 200 may be separable from the nonconductive part 310*b* of the lateral member 310. According to an embodiment, the frame member 200 may be combined with the lateral member 310 in a manner that the locking protrusions 213 formed on the frame member 200 are locked in the locking grooves 313 formed on the side surface of the lateral member 310. According to an embodiment, in a combined state, at least a part of the lateral member 310 may be externally visible. According to an embodiment, the at least a part of the lateral member 310 that is externally visible may include the nonconductive part 310*b*.

According to various embodiments, the electronic device 300 may include at least one unit conductive part 310*a*-1, 310*a*-2, and 310*a*-3 that is separated from the conductive part 310*a* by the nonconductive part 310*b*. Such at least one unit conductive part 310*a*-1, 310*a*-2, and 310*a*-3 may be electrically connected to the wireless communication circuit (e.g., wireless communication circuit F of FIG. 5) disposed in the inner space 3001 of the electronic device 300 and may operate as an antenna. According to an embodiment, the at least one unit conductive part 310*a*-1 and 310*a*-3 may be disposed in an island manner in which the at least one unit conductive part 310*a*-1 and 310*a*-3 is electrically disconnected from the neighboring conductive part 310*a* through the nonconductive part 310*b*. According to an embodiment, the at least one unit conductive part 310*a*-1 and 310*a*-3 is used as the antenna and corresponding parts of the frame member 200 may be formed of a nonmetal material (e.g., injection part) in order to reduce the performance deterioration of the antenna. In some embodiments, the at least one unit conductive part 310*a*-1 and 310*a*-3 may be disposed in substantially the same manner at locations to improve stiffness of the electronic device 300, and may not necessarily operate as the antenna. For example, one of the at least one unit conductive part 310*a*-1, 310*a*-2, 310*a*-3, and 310*a*-4 may be electrically separated from the wireless communication circuit F.

FIG. 11 is a cross-sectional view of an electronic device according to various embodiments.

In describing the electronic device 300 of FIG. 11, the same reference numerals are given to substantially the same constituent elements as those of the electronic device 300 of FIG. 10, and the detailed description thereof may be omitted.

With reference to FIG. 11, the electronic device 300 may include the frame member 200 combined with the side surface 3103 of the lateral member 310. According to an embodiment, the side surface 3103 of the lateral member 310 may completely covered by the frame member 200 so as not to be externally visible. In some embodiments, although at least a part of the conductive part 310*a* may be exposed to the side surface 3103 through the at least a part of the lateral member 310, such an exposed part may be covered by the frame member 200 and not externally visible.

According to various embodiments, an electronic device (e.g., electronic device 300 of FIG. 3A) may include: a first plate (e.g., first plate 320 of FIG. 3A); a second plate (e.g., second plate 380 of FIG. 3A); a lateral member (e.g., lateral member 310 of FIG. 3A) provided around a space (e.g., space 3001 of FIG. 9A) between the first plate and the second plate, the lateral member including a conductive part (e.g., conductive part 310*a* of FIG. 3A) and a nonconductive part (e.g., nonconductive part 310*b* of FIG. 3A); a frame member (e.g., frame member 200 of FIG. 3A) provided at least partly along a border of the lateral member, and at least partially forming a side surface of the electronic device; and a display in the space and facing the first plate, wherein the frame member may be coupled with the nonconductive part.

According to various embodiments, the lateral member may include a support member extending into the space, and the support member may include the nonconductive part.

According to various embodiments, the nonconductive part may extend along the border of the lateral member.

According to various embodiments, the nonconductive part may form a closed loop around the lateral member.

According to various embodiments, the nonconductive part may be externally exposed between the frame member and the first plate and/or between the frame member and the second plate.

According to various embodiments, the frame member may completely cover the nonconductive part so the nonconductive part is not externally visible.

According to various embodiments, the frame member may include hook structures and the nonconductive part may define locking grooves configured to accommodate the hook structures.

According to various embodiments, the frame member may be coupled with the nonconductive part through at least one process of taping, fusing, or bonding.

According to various embodiments, the conductive part and the nonconductive part may be coupled with each other through insert injection.

According to various embodiments, the frame member may be formed of any one or any combination of an injection part, glass fiber reinforced plastic (GFRP), or carbon fiber reinforced plastic (CFRP).

According to various embodiments, the electronic device may include: a first waterproof member provided between the first plate and the nonconductive part; and a second waterproof member provided between the second plate and the nonconductive part. The space may be sealed through the first waterproof member and the second waterproof member.

According to various embodiments, the first waterproof member and/or the second waterproof member may include at least one of a tape, an adhesive, a waterproof dispensing, silicone, a waterproof rubber, or urethane.

According to various embodiments, the frame member may be a replaceable decoration member having a designated color and/or texture.

According to various embodiments, the electronic device may further include: at least one conductive part extending through the nonconductive part; and a wireless communication circuit provided in the space and configured to transmit and/or receive a wireless signal in a designated frequency band through the at least one conductive part.

According to various embodiments, the at least one conductive part may not be covered by the frame member.

According to various embodiments, an electronic device (e.g., electronic device 300 of FIG. 3A) may include: a first plate (e.g., first plate 320 of FIG. 3A); a second plate (e.g., second plate 380 of FIG. 3A); a lateral member (e.g., lateral member 310 of FIG. 3A) provided around a space (e.g., space 3001 of FIG. 9A) between the first plate and the second plate, and including a conductive part (e.g., conductive part 310*a* of FIG. 3A) and a nonconductive part (e.g., nonconductive part 310b of FIG. 3A); a display (e.g., display 330 of FIG. 3A) provided in the space and facing the first plate; a wireless communication circuit (e.g., wireless communication circuit F of FIG. 5) provided in the space, and configured to transmit and/or receive a wireless signal in a designated frequency band through at least a part of the conductive part; and a frame member (e.g., frame member 200 of FIG. 3A) provided at least partly along a border of the lateral member. The frame member may be coupled with the nonconductive part.

According to various embodiments, the conductive part may include at least one segment, and the wireless communication circuit may be electrically connected to the at least one segment.

According to various embodiments, segment traces of the nonconductive part and the at least one unit conductive part may be provided to not be externally visible through the frame member.

According to various embodiments, the frame member may be formed of any one or any combination of an injection part, glass fiber reinforced plastic (GFRP), or carbon fiber reinforced plastic (CFRP).

According to various embodiments, an electronic device may include: a first plate; a second plate; a bracket provided around a space between the first plate and the second plate, and including a conductive part and a nonconductive part; a first waterproof member provided between the first plate and the bracket; a second waterproof member provided between the second plate and the bracket; and a deco member that is externally visible and provided at least partly along a border of the bracket, and forming at least a part of a side surface of the electronic device. The deco member may be coupled with the nonconductive part.

While aspects of embodiments have been particularly shown and described, it will be understood that various changes in form and details may be made therein without departing from the spirit and scope of the following claims.

What is claimed is:

1. An electronic device comprising:
   a first plate;
   a second plate;
   a lateral member provided around a space between the first plate and the second plate, the lateral member comprising a conductive part and a nonconductive part;
   a frame member provided at least partly along a border of the lateral member and at least partially forming a side surface of the electronic device; and
   a display disposed to be able to be viewed from outside of the electronic device through the first plate in the space,
   wherein the frame member is coupled with the nonconductive part and is visible from outside of the electronic device,
   wherein the nonconductive part is externally exposed between the frame member and the first plate and/or between the frame member and the second plate, and
   wherein the conductive part is not visible from outside of the electronic device.

2. The electronic device of claim 1, wherein the lateral member comprises a support member extending into the space, and
   wherein the support member comprises the nonconductive part.

3. The electronic device of claim 1, wherein the nonconductive part extends along the border of the lateral member.

4. The electronic device of claim 3, wherein the nonconductive part forms a closed loop.

5. The electronic device of claim 1, wherein the frame member comprises a plurality of sides, each of the plurality of sides comprising a plurality of locking protrusions that are accommodated by locking grooves defined by the nonconductive part.

6. The electronic device of claim 1, wherein the frame member is coupled with the nonconductive part through at least one process of taping, fusing, or bonding.

7. The electronic device of claim 1, wherein the conductive part and the nonconductive part are coupled with each other through insert injection.

8. The electronic device of claim 1, wherein the frame member comprises at least one of an injection part, glass fiber reinforced plastic (GFRP), or carbon fiber reinforced plastic (CFRP).

9. The electronic device of claim 8, further comprising:
   a first waterproof member provided between the first plate and the nonconductive part; and
   a second waterproof member provided between the second plate and the nonconductive part,
   wherein the space is sealed through the first waterproof member and the second waterproof member.

10. The electronic device of claim 9, wherein at least one of the first waterproof member or the second waterproof member comprises at least one of a tape, an adhesive, silicone, a waterproof rubber, or urethane.

11. The electronic device of claim 1, wherein the frame member is a replaceable decoration member having a designated color and/or texture and visibly disposed on the side surface.

12. The electronic device of claim 1, wherein the conductive part extends through the nonconductive part, and
   wherein the electronic device further comprises a wireless communication circuit provided in the space and configured to transmit or receive a wireless signal in a designated frequency band through the conductive part.

13. The electronic device of claim 12, wherein the conductive part is not covered so as not to be visible from the outside of the electronic device through the frame member.

14. An electronic device comprising:
   a first plate;
   a second plate;
   a lateral member provided around a space between the first plate and the second plate, the lateral member comprising a conductive part and a nonconductive part;
   a frame member extending along a border of the lateral member around the space; and
   a wireless communication circuit provided in the space and electrically connected to the conductive part,
   wherein the frame member is coupled with the nonconductive part and is visible from outside of the electronic device,
   wherein the nonconductive part is externally exposed between the frame member and the first plate and/or between the frame member and the second plate, and
   wherein the conductive part is not visible from outside of the electronic device.

15. The electronic device of claim 14, wherein the wireless communication circuit is configured to use the conductive part as an antenna.

16. The electronic device of claim 14, wherein the conductive part is one from among a plurality of conductive parts that are provided throughout the electronic device.

17. The electronic device of claim 14, further comprising a display that is provided in the space and faces the first plate.

18. An electronic device comprising:
a housing including a first plate, a second plate and a lateral member provided around a space between the first plate and the second plate, the lateral member comprising a conductive part and a nonconductive part;
a frame member extending along a border of the lateral member around the space;
a wireless communication circuit provided in the space and electrically connected to the conductive part; and
a display that is provided in the space and faces the first plate,
wherein the frame member is coupled with the nonconductive part and is visible from outside of the electronic device,
wherein the nonconductive part is externally exposed between the frame member and the first plate and/or between the frame member and the second plate, and
wherein the conductive part is not visible from outside of the electronic device.

* * * * *